US010042498B2

(12) United States Patent
Nagata et al.

(10) Patent No.: US 10,042,498 B2
(45) Date of Patent: Aug. 7, 2018

(54) METHOD OF PRODUCING POSITION INPUT DEVICE

(71) Applicant: Sharp Kabushiki Kaisha, Sakai, Osaka (JP)

(72) Inventors: Kosuke Nagata, Sakai (JP); Masayuki Hata, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/308,386

(22) PCT Filed: May 1, 2015

(86) PCT No.: PCT/JP2015/063068
§ 371 (c)(1),
(2) Date: Nov. 2, 2016

(87) PCT Pub. No.: WO2015/170677
PCT Pub. Date: Nov. 12, 2015

(65) Prior Publication Data
US 2017/0068355 A1    Mar. 9, 2017

(30) Foreign Application Priority Data

May 8, 2014   (JP) .................................. 2014-096845

(51) Int. Cl.
*G06F 3/044*   (2006.01)

(52) U.S. Cl.
CPC .... *G06F 3/044* (2013.01); *G06F 2203/04102* (2013.01); *G06F 2203/04103* (2013.01);
(Continued)

(58) Field of Classification Search
CPC ................... G06F 3/044; G06F 3/0412; G06F 2203/04102; G06F 2203/04103;
(Continued)

(56) References Cited

U.S. PATENT DOCUMENTS 7,403,135 B1 *   7/2008   Kaski .................. A63B 71/0605
                                                        200/600
9,110,542 B2 *   8/2015   Yokota .................. G06F 3/0416
(Continued)

FOREIGN PATENT DOCUMENTS

JP      2010-244772 A      10/2010
JP      2011-527787 A      11/2011
(Continued)

OTHER PUBLICATIONS

Official Communication issued in International Patent Application No. PCT/JP2015/063068, dated Jun. 30, 2015.

*Primary Examiner* — Tom Sheng
(74) *Attorney, Agent, or Firm* — Keating & Bennett, LLP

(57) ABSTRACT

A method of producing a touchscreen 12 includes a pattern forming process, a cutting process, and a three-dimensional forming process. The pattern forming process is for forming a touchscreen pattern 12P including at least electrode portions 17 and line portions on a plate surface of a base that has a sheet shape with flexibility. The cutting process is for cutting a use portion 16U out of the base 16 on which the touchscreen pattern 12 is formed. The three-dimensional shape forming process is for forming the use portion 16U out of the base 16 into a three-dimensional shape.

8 Claims, 17 Drawing Sheets

(52) U.S. Cl.
CPC ............... *G06F 2203/04111* (2013.01); *G06F 2203/04112* (2013.01)

(58) Field of Classification Search
CPC .. G06F 2203/04111; G06F 2203/04112; G06F 2203/04113
See application file for complete search history.

(56) References Cited

U.S. PATENT DOCUMENTS

| | | | |
|---|---|---|---|
| 9,547,397 B2* | 1/2017 | Lee | .......... G06F 3/044 |
| 2009/0314550 A1 | 12/2009 | Layton | |
| 2010/0001973 A1 | 1/2010 | Hotelling et al. | |
| 2012/0032916 A1* | 2/2012 | Enoki | ...................... G06F 3/044 345/174 |
| 2013/0175154 A1 | 7/2013 | Takahashi | |
| 2013/0277094 A1 | 10/2013 | Lee | |
| 2013/0293513 A1 | 11/2013 | Hotelling et al. | |
| 2014/0036165 A1 | 2/2014 | Takahashi et al. | |
| 2014/0139484 A1 | 5/2014 | Hotelling et al. | |
| 2014/0247247 A1 | 9/2014 | Hotelling et al. | |
| 2014/0360856 A1* | 12/2014 | Mizumoto | .............. G06F 3/044 200/600 |
| 2015/0160760 A1 | 6/2015 | Sato | |
| 2015/0309623 A1 | 10/2015 | Hotelling et al. | |

FOREIGN PATENT DOCUMENTS

| | | |
|---|---|---|
| JP | 2013-225279 A | 10/2013 |
| JP | 5347096 B1 | 11/2013 |
| WO | 2012/043189 A1 | 4/2012 |

* cited by examiner

METHOD OF PRODUCING POSITION INPUT DEVICE

TECHNICAL FIELD

The present invention relates to a method of producing a position input device.

BACKGROUND ART

In recent years, more and more liquid crystal display panels with touchscreens are installed in electronic devices such as tablet notebook computers and portable digital assistants to improve operability and usability. The touchscreens have transmissivity. When a user touch a display surface of the liquid crystal panel with a finger or a stylus, information on a touch position in a plane of the liquid crystal panel is entered. This provides the user with intuitive operation, that is, direct feeling as if he or she touches an image displayed on the liquid crystal panel. An example of display devices including such a touchscreen disclosed in Patent Document 1 has been known.

Patent Document 1 discloses a method of producing a touchscreen. The method includes producing a touchscreen film heat forming body by heat-forming a touchscreen film, and preparing a touchscreen molded body including touch input areas on a main surface and a side surface through film insert molding and film in-mold molding.

RELATED ART DOCUMENT

Patent Document

Patent Document 1: Japanese Patent Publication No. 5347096

Problem to be Solved by the Invention

According to the method of producing the touchscreen disclosed in Patent Document 1, a touchscreen forming body is prepared in a preferable three-dimensional shape by forming a touchscreen having a predefined touchscreen pattern. Therefore, to alter the three-dimensional shape of the touchscreen forming body, the design of the touchscreen pattern needs to be modified. To produce various kinds of touchscreen forming bodies having different three-dimensional shapes, a production cost tends to increase. Furthermore, it is difficult to increase flexibility in three-dimensional shaping of the touchscreen forming body.

Disclosure of the Present Invention

The technology disclosed in this description was made in view of the above circumstances. An object is to reduce a production cost and increase flexibility of three-dimensional shaping.

Means for Solving the Problem

A method of producing a position input device according to the present invention includes a pattern forming process, a cutting process, and a three-dimensional shape forming process. The pattern forming process is for forming at least one position input pattern including at least an electrode portion and a line portion on a plate surface of a base having a sheet shape and flexibility. The cutting process is for cutting a use portion out of the base on which the at least one position input pattern is formed. The three-dimensional shape forming process is for forming the use portion cut out of the base into a three-dimensional shape.

In the pattern forming process, the position input pattern including at least the electrode portion and the line portion is formed on the plate surface of the base. In the cutting process, the use portion used for the position input device out of the base on which the position input pattern in formed. In the three-dimensional shape forming process, the use portion that is cut out of the base formed in the sheet shape with flexibility into the three-dimensional shape. Through the processes, the position input device formed in the predefined three-dimensional shape is prepared.

The three-dimensional shape of the position input device can be easily altered by altering the shape of the use portion, that is, altering the cutout portion of the base in the cutting process. Namely, only a single kind of the base on which the position input pattern is formed is provided, the position input device can be produced in various three-dimensional shapes by altering the cutout portion. This reduces the production cost. Furthermore, the position input device can be easily formed into complicated shape by properly defining the cutout portion of the base. Namely, the flexibility in designing the three-dimensional shape of the position input device to be produced further increases.

The following is preferable configurations for embodiments of the present invention.

(1) The pattern forming process may include forming the at least one position input pattern on the plate surface of the base. The at least one position input pattern includes first electrodes, second electrodes, an insulating layer, terminals, first lines, and second lines. The first electrodes may be included in the electrode portion. The first electrodes may include first unit electrodes that are arranged along a first direction along the plate surface of the base and linked one another. Lines of the first electrodes may be arranged along the second direction along the plate surface of the base and perpendicular to the first direction. The second electrodes may be included in the electrode portion. The second electrodes may include second unit electrodes that are arranged along the second direction and adjacent to the first unit electrodes in a plan view and linked one another. Lines of the second electrodes may be arranged along the first direction. The insulating layer may be arranged between the first electrodes and the second electrodes crossing each other. The insulating layer may be for insulating the first electrodes from the second electrodes. The terminals may be arranged at one end of the base with respect to the first direction. The first lines may be included in the line portion. The first lines may extend from the first unit electrodes that are arranged at an end closer to the terminals. Ends of the first lines may be connected to the terminals. The second lines may be included in the line portion. The second lines may extend from the second electrodes. Ends of the second lines may be connected to the terminals. The second lines may be routed in spaces between the first unit electrodes and the second unit electrodes adjacent to each other in a plan view. The first electrodes include the first unit electrodes that are arranged along the first direction and linked one another. The second electrodes include the second unit electrodes that are arranged along the second direction perpendicular to the first direction and linked one another. Although the first electrodes and the second electrodes cross one another, the first electrodes are insulated from the second electrodes with the insulating layer. The ends of the first lines extending from the first unit electrodes arranged closer to the terminals are connected to the terminals and thus signals from the terminals are transmitted to the first electrodes. The ends of the second lines extending from the second electrodes re connected to the terminals and thus signals from the terminals are transmitted to the second electrodes. The second lines are routed in the spaces between the first unit electrodes and the second unit electrodes adjacent to each other in a plan view. In comparison to a configuration in which the second lines are routed around the electrode portion, a larger portion of the base can be cut out in the cutting process. Therefore, the flexibility in designing the shape of the use portion that is cut out of the base, that is, the three-dimensional shape of the position input device increases.

(2) The pattern forming process may include arranging the second lines connected to the second electrodes that are farther from the terminals closer to a middle with respect to the first direction and arranging the second lines connected to the second electrodes that are closer to the terminals closer to ends with respect to the first direction. In the portion of the base closer to the terminals with respect to the first direction, the second lines are arranged closer to the end with respect to the first direction. In the portion of the base closer to the end opposite from the terminals, the second lines are not arranged closer to the end with respect to the first direction. The portions of the base closer to the end opposite from the terminals with respect to the first direction and closer to the sides can be cut out in the cutting process. Therefore, the cutout portion can be more flexibly altered and thus the position input device can be produced in more various three-dimensional shapes. Furthermore, the use portion that is cut out of the base can be formed in triangular shapes in a plan view. Therefore, the flexibility in designing the shape of the use portion that is cut out of the base, that is, the three-dimensional shape of the position input device further increases.

(3) The pattern forming process may include forming position input patterns that are included in the at least one position input pattern along the second direction. The cutting process may include cutting the use portion out of the base such that triangular portions having a larger width on a terminal side with respect to the first direction in a plan view may be arranged along the second direction to correspond to portions in which the position input patterns are formed and such that the triangular portions continue from one another. The forming process may include forming the use portion into a hemispherical shape. This is preferable for producing the position input device having the hemispherical shape.

(4) The pattern forming process may include forming the at least one position input pattern on the plate surface of the base. The at least one position input pattern may include first electrodes, second electrodes, terminals, first lines, and second lines. The first electrodes may be included in the electrode portion. The first electrodes may include first unit electrodes that are arranged along a first direction along the plate surface of the base and linked one another. Lines of the first electrodes may be arranged along a second direction along the plate surface of the base and perpendicular to the first direction. The second electrode may be included in the electrode portion. The second electrode may include second unit electrodes that are arranged along the first direction and adjacent to the first unit electrodes with respect to the second direction. Lines of the second electrodes may be arranged along the second direction. The terminals may be arranged at one end of the base with respect to the first direction. The first lines may be includes in the line portion. The first lines may extend from the first unit electrodes that are arranged at an end closer to the terminals. Ends of the first lines may be connected to the terminals. The second lines may be included in the line portion. The second lines may extend from the respective second unit electrodes. Ends of the second lines may be connected to the terminals. The second lines may be routed between the first unit electrodes and the second unit electrodes adjacent to each other with respect to the second direction. The first electrodes include the first unit electrodes that are arranged along the first direction and linked one another. The ends of the first lines extending from the first unit electrodes arranged closer to the terminals are connected to the terminals and thus signals from the terminals are transmitted to the first electrodes. The second electrodes include the second unit electrodes that are arranged along the second direction perpendicular to the first direction and linked one another. The ends of the second lines extending from the second unit electrodes are connected to the terminals and thus signals from the terminals are transmitted to the second electrodes. The second lines are routed between the first unit electrodes and the second unit electrodes adjacent to each other with respect to the second direction. In comparison to a configuration in which the second lines are routed around the electrode portion, a larger portion of the base can be cut out in the cutting process. Therefore, the flexibility in designing the shape of the use portion that is cut out of the base, that is, the three-dimensional shape of the position input device increases.

(5) The pattern forming process may include forming the second electrodes as driving electrodes for generating electric fields and the first electrodes as detecting electrodes for detecting the electric fields generated by the driving electrodes. The first electrodes include the first unit electrodes that are linked one another and connected to the terminals via the first lines. The second unit electrodes of second electrodes are connected to the respective terminals via the second lines. The second electrodes are the driving electrodes and the first electrodes are the detecting electrodes. Therefore, if the user brings his or her finger closer to the position detecting device and any of the electric fields generated by the second unit electrodes is absorbed, intensity of the electric fields detected by the detecting electrodes varies. An input position is detected based on in what second unit electrode such a variation in intensity of the electric fields occurs.

(6) The cutting process may include cutting the use portion out of the base such that triangular portions having a larger width on a terminal side with respect to the first direction in a plan view are arranged along the second direction and continue from one another. The forming process may include forming the use portion into a hemispherical shape. This is preferable for producing the position input device having the hemispherical shape.

(7) The cutting process may include cutting the use portion out of the base such that a main portion including a central portion and peripheral portion including edge portions continue from the main portion. The forming process may include forming the use portion into a three-dimensional shape such that plate surfaces of the peripheral portions are perpendicular to a plate surface of the main portion. This is preferable for producing the position input device having the three-dimensional shape with the plate surfaces of the peripheral portions perpendicular to the plate surface of the main portion.

Advantageous Effect of the Invention

According to the present invention, the production cost can be reduced and flexibility in designing the three-dimensional shape increases.

MODE FOR CARRYING OUT THE INVENTION

<First Embodiment>

Figure 1:
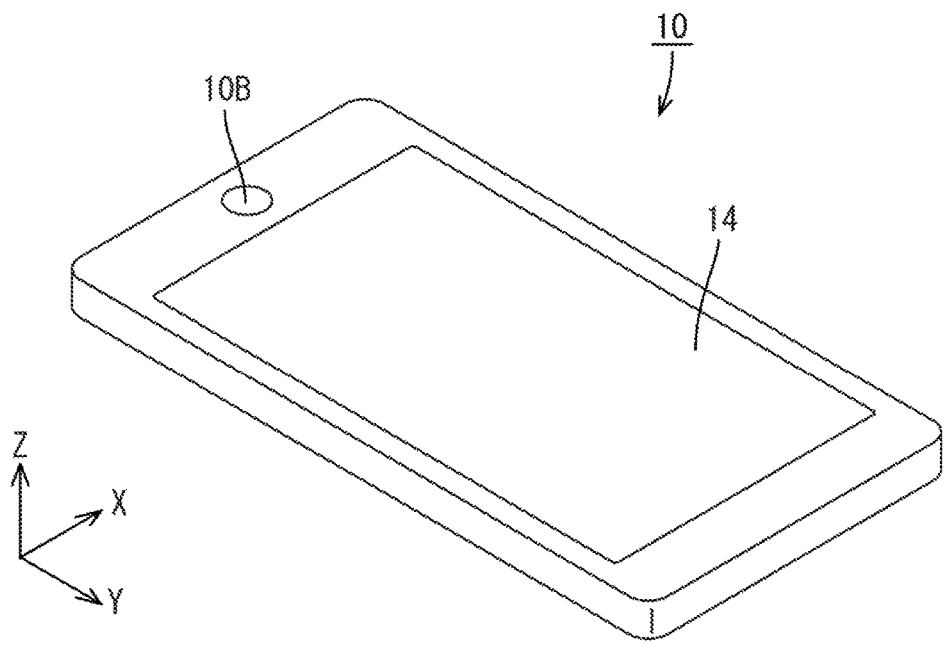
FIG. 1 is a perspective view of a liquid crystal display device according to a first embodiment illustrating a general configuration thereof.

A first embodiment will be described with reference to FIGS. 1 to 9. In this embodiment section, a method of producing a touchscreen (a position input device) 12 included in a liquid crystal display device 10 will be described. X-axes, Y-axes, and Z-axes may be present in the drawings. The axes in each drawing correspond to the respective axes in other drawings. The vertical direction is defined based on FIG. 2. An upper side in FIG. 2 corresponds to a front side of the liquid crystal display device 10. A lower side in FIG. 2 corresponds to a rear side of the liquid crystal display device 10.

Figure 2:
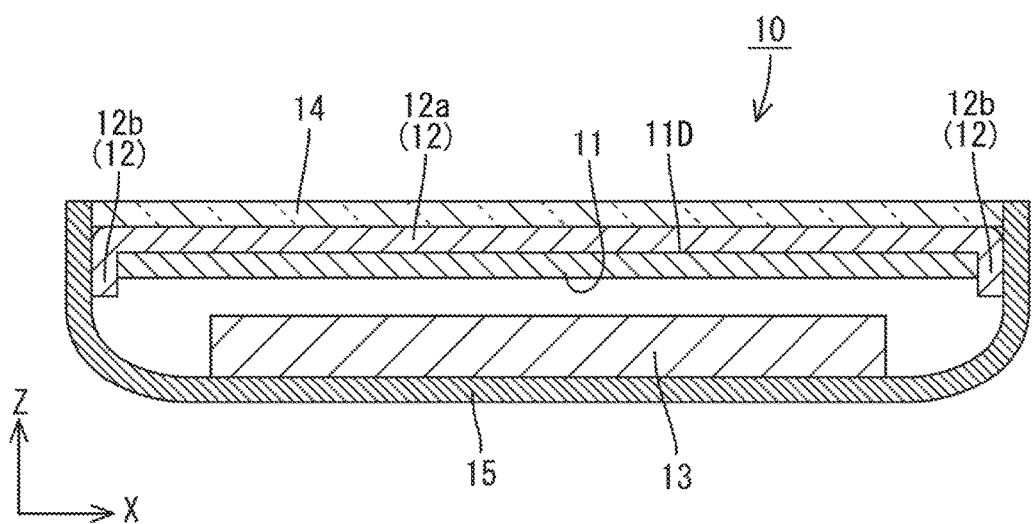
FIG. 2 is a cross-sectional view illustrating the general configuration of the liquid crystal display device.

First, a configuration of the liquid crystal display device 10 will be described. As illustrated in FIGS. 1 and 2, the liquid crystal display device 10 includes a liquid crystal panel (a display panel) 11, a touchscreen (a position input device) 12, a backlight unit (a lighting device) 13, and a cover panel (a protective panel, a cover glass) 14. The liquid crystal panel 11 has a vertically-long rectangular overall shape. The liquid crystal panel 11 is for displaying images. The touchscreen 12 is for inputting information on in-plane positions on a display surface 11D. The backlight unit 13 is an external light source for supplying light to the liquid crystal panel 11. The cover panel 14 is for protecting the touchscreen 12. The touchscreen 12 is disposed on the front side of the liquid crystal panel 11 (the display surface 11 side, the light exiting side). The cover panel 14 is disposed on the front side of the touchscreen 12. The liquid crystal panel 11, the touchscreen 12, and the cover panel 14 are laid in layers and bonded together with adhesive layers that are not illustrated. The liquid crystal display device 10 further includes a case 15 that holds the liquid crystal panel 11, the touchscreen 12, and the cover panel 14 that are bonded together and the backlight unit 13 therein. The case 15 is made of synthetic resin. The case 15 has a substantially box shape that opens toward the front and includes a curved peripheral end on the bottom-plate side. The liquid crystal display device 10 according to this embodiment is for an electric device such as a smartphone. Screen sizes of the liquid crystal panel 11 and the touchscreen 12 in the liquid crystal display device 10 are some inches, that is, usually classified into a small size category.

The liquid crystal panel 11 will be described. As illustrated in FIG. 2, the liquid crystal panel 11 includes a pair of substantially transparent glass substrates having a vertically long rectangular shape (with high light transmissivity). The glass substrates are bonded together with a predefined gap (a cell gap) therebetween. Liquid crystals are sealed between the substrates. One of the substrates disposed on the rear side is an array substrate on which switching components (e.g., TFTs) connected to source lines and gate lines that are perpendicular to one another, pixel electrodes connected to the switching components, and an alignment film are disposed. The other substrate disposed on the front side is a CF substrate on which color filters including R (red), G (green), and B (blue) color portions arranged in a predefined pattern, a counter electrode, and an alignment film are disposed. Polarizing plates are bonded to outer surfaces of the substrates, respectively.

As illustrated in FIG. 1, the cover panel 14 has a vertically long rectangular shape. The cover panel 14 includes a round cutout in an end portion thereof close to one of short edges. A pressing operation portion 10B referred to as "a home button" is arranged in the cutout. The cover panel 14 is made of substantially transparent glass having high light transmissivity, preferably tempered glass. The tempered glass used for the cover panel 14 is preferably a chemically tempered glass including a chemically tempered layer on a surface of a glass base having a plate shape formed through a chemical tempering process. The chemical tempering process is for tempering the glass base having the plate shape by replacing alkali metal ions in the glass with alkali metal ions having larger diameters through ion exchange. The chemically tempered layer formed in the process is a compression stress layer (an ion exchange layer) in which a compression stress remains. The cover panel 14 has high mechanical strength and shock resistance. Therefore, the touchscreen 12 and the liquid crystal panel 11 disposed behind the cover panel 14 are properly protected from damage or scratch.

Before describing the touchscreen 12, the backlight unit 13 will be described. The backlight unit 13 is a so-called edge light type (a side light type). The backlight unit 13 includes a light source, a substantially box shaped chassis, a light guide member (a light guide plate), and an optical member. The light source may be LEDs. The chassis has opening on the front side (on the liquid crystal panel 11 side, the light exiting side). The chassis holds the light source therein. The light guide member includes an end to which the light source is opposed. The light guide member directs light from the light source toward the opening of the chassis. The optical member is disposed to cover the opening of the chassis. The light emitted by the light source enters the light guide member through the end, travels through the light guide member, and exits the light guide member. The light is guided by the light guide member to travel toward the opening of the chassis and then converted into planar light having even in-plane luminous distribution by the optical member. The liquid crystal panel 11 is lit with the light. The light transmissivity to transmit through the liquid crystal panel 11 within the display surface 11D is selectively controlled through driving of the TFTs included in the liquid crystal panel 11. According to the configuration, specified images are displayed on the display surface 11D. The light source, the chassis, the light guide member, and the optical member will not be illustrated in detail in the drawings.

Figure 3:
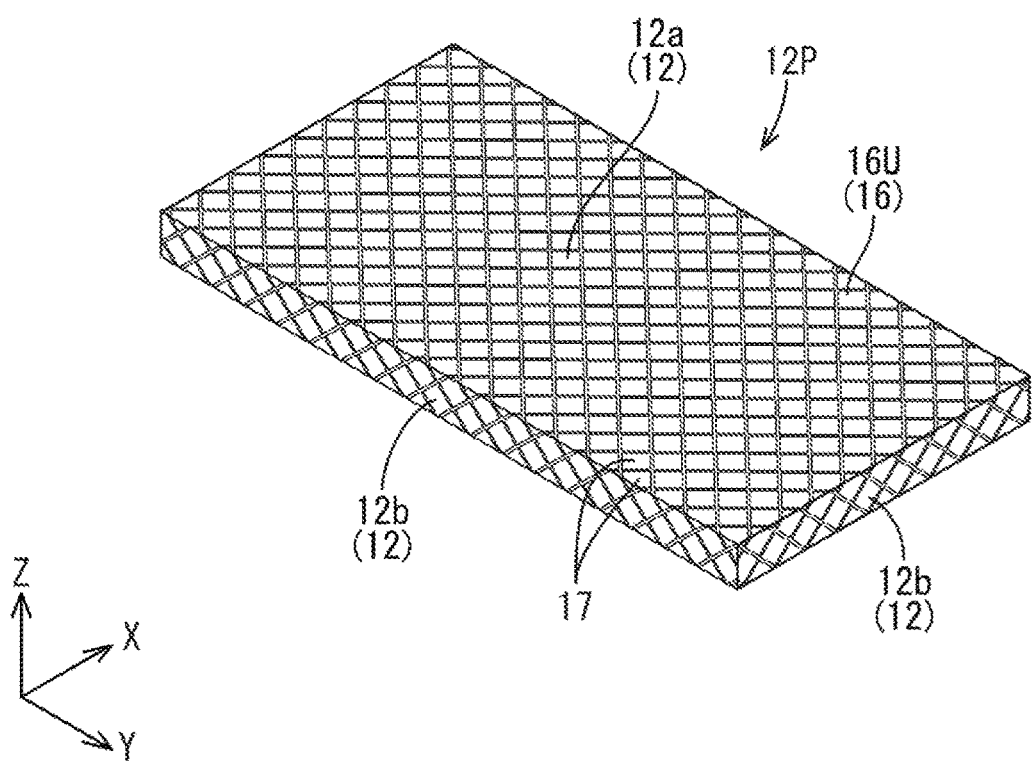
FIG. 3 is a perspective view schematically illustrating a touchscreen in a three-dimensional shape.
Figure 4:
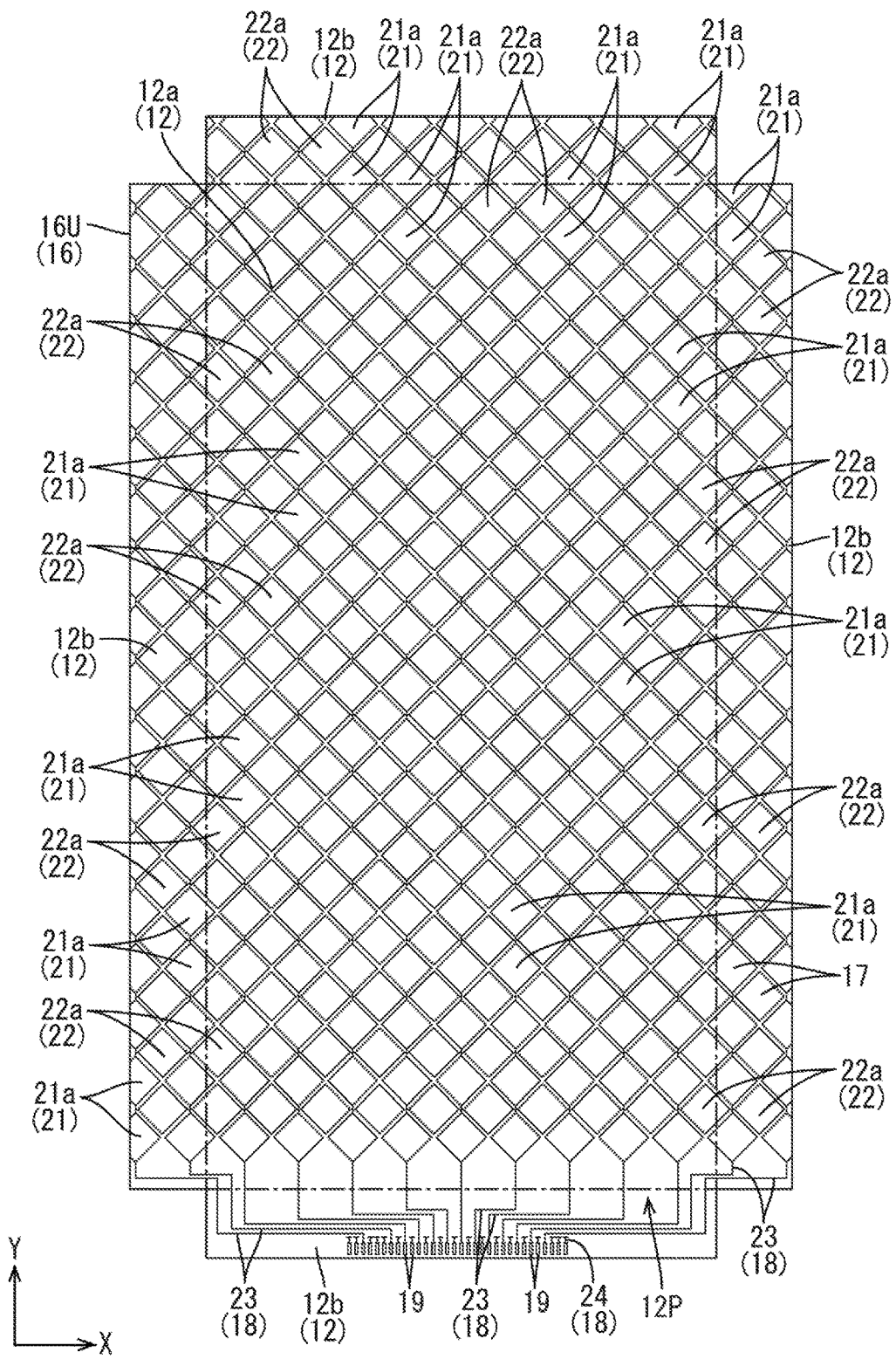
FIG. 4 is a developed view of a touchscreen.

The touchscreen 12 will be described. The touchscreen 12 according to this embodiment is a so-called projected capacitive touch type. As illustrated in FIGS. 3 and 4, the touchscreen 12 includes a touchscreen pattern (a position input pattern) 12P formed on a plate surface of a base 16 for detecting input positions. The touchscreen 12 has sufficient transmissivity for not blocking images displayed on the liquid crystal panel 11 to be viewed. A detailed configuration of the touchscreen 12 will be described later. The base 16 is made of substantially transparent synthetic resin (having high light transmissivity). The base 16 has a sheet shape (or a film shape) with a thickness such that the base 16 freely bends or curves, that is, having sufficient flexibility. The touchscreen 12 includes a main portion 12a and peripheral portions 12b. The main portion 12a includes plate surfaces parallel to the display surface 11D of the liquid crystal panel 11. The side portions include plate surfaces that are substantially perpendicular to the plate surfaces of the main portion 12a. The main portion 12a includes a major section including a central area of the base 16 with respect to the X-axis direction and the Y-axis direction. The major section has a vertically long rectangular shape in a plan view similar to the liquid crystal panel 11. The major section includes an effective touching area (an effective position detecting area, an electrode forming area) in the touchscreen pattern 12P. The effective touching area is an area in which input positions of a user are effectively detectable. Four peripheral portions 12b continue from four sides of the main portion 12a, respectively. The peripheral portions 12b are located at end of the central portion of the base 16 with respect the X-axis direction and the Y-axis direction. Three peripheral portions 12b including a pair of the peripheral portions 12b located at long sides and one of the peripheral portions 12b located a short side opposite from the pressing operation portion 10B (on a closer side in FIG. 3) include auxiliary portions of the effective touching area in the touchscreen pattern 12P. FIG. 4 illustrates the touchscreen 12 that is developed, that is, before formed in a three dimensional shape illustrated in FIG. 3. In FIG. 4, boundaries between the main portion 12a and the peripheral portions 12b, that is, lines at which portions of the touchscreen 12 are bent in a forming process are indicated with two-dot chai lines.

As illustrated in FIG. 3, the touchscreen 12 has a three-dimensional shape, specifically, a substantially box shape with a hollow and an opening on the rear side. The touchscreen 12 in such a three-dimensional shape is assembled in the liquid crystal display device 10. In the liquid crystal display device 10, input positions within the display surface 11D of the liquid crystal panel 11 are detectable by the main portion 12a. Input positions within three peripheral surfaces other than the peripheral surface on the short side or the pressing operation portion 10B side (a pair of the peripheral surfaces on the long side and the peripheral surface on the short side opposite from the side on the pressing operation portion 10B side) are detectable by the respective peripheral portions 12b. The main portion 12a is covered with the cover panel 14 and the peripheral portions 12b are covered with the case 15. In the main portion 12a, position information based on images displayed on the display surface 11d of the liquid crystal panel 11 can be input through the cover panel 14. In peripheral portions 12b, position information based on operation displays (not illustrated) printed or formed on peripheral surfaces of the case 15, which are the peripheral surfaces of the liquid crystal display device 10, by other method can be input. The operation displays include a volume control, a power control, and other operations.

Next, the touchscreen pattern 12P will be described in detail. As illustrated in FIG. 4, the touchscreen pattern 12P includes electrode portions 17, line portions 18, terminals 19, and insulating layers 20. The electrode portions 17 include first electrodes 21 and second electrodes 22. The line portions 18 include first lines 23 and second lines 24. The terminals 19 are connected to the line portions 18. The insulating layers 20 are disposed between the first electrode portions and the second electrodes 22. The electrode portions 17 are connected to a touchscreen control board, which is not illustrated, via the terminals 19 and the line portions 18. The touchscreen control board detects variations in capacitance between the first electrodes 21 and the second electrodes 22 of the electrode portions 17. Furthermore, the touchscreen control board identifies positions in the effective touching area at which the variations occur. The effective touching area substantially correspond with an area in which the electrode portions 17 (the first electrodes 21 and the second electrodes 22) are formed. In the area in which the electrode portions 17 are formed, input positions are effectively detectable. The electrode portions 17 (the first electrodes 21 and the second electrodes 22) are formed on the peripheral portions 12b of the touchscreen 12 in addition to the main portion 12a. Some of the first electrodes 21 and the second electrodes 22 are formed across the main portion 12a and the peripheral portions 12b. The electrode portions 17 and the line portions 18 are made of substantially transparent light transmissive conductive material such as indium tin oxide (ITO) and zinc oxide (ZnO). The terminals 19 are made of metal material having high electric conductivity. The insulating layers 20 are made of substantially transparent light transmitting resin material. In FIGS. 4 to 9, sizes and arrangements of the electrode portions 17, the line portions 18, and the terminals 19 in a plan view are schematically illustrated for explanation. Actual sizes are smaller and the arrangements are denser in comparison to those in the drawings.

As illustrated in FIG. 4, the first electrodes 21 and the second electrodes 22 of the electrode portions 17 are arranged to fill the plate surface of the base 16. The first electrodes 21 are arranged along the Y-axis direction, which corresponds with a first direction. The second electrodes 22 are arranged along the X-axis direction, which corresponds with a second direction perpendicular to the first direction. Multiple lines of the first electrodes 21 arranged along the Y-axis direction are arranged along the X-axis direction. Multiple lines of the second electrodes 22 arranged along the X-axis direction are arranged along the Y-axis direction.

Figure 6:
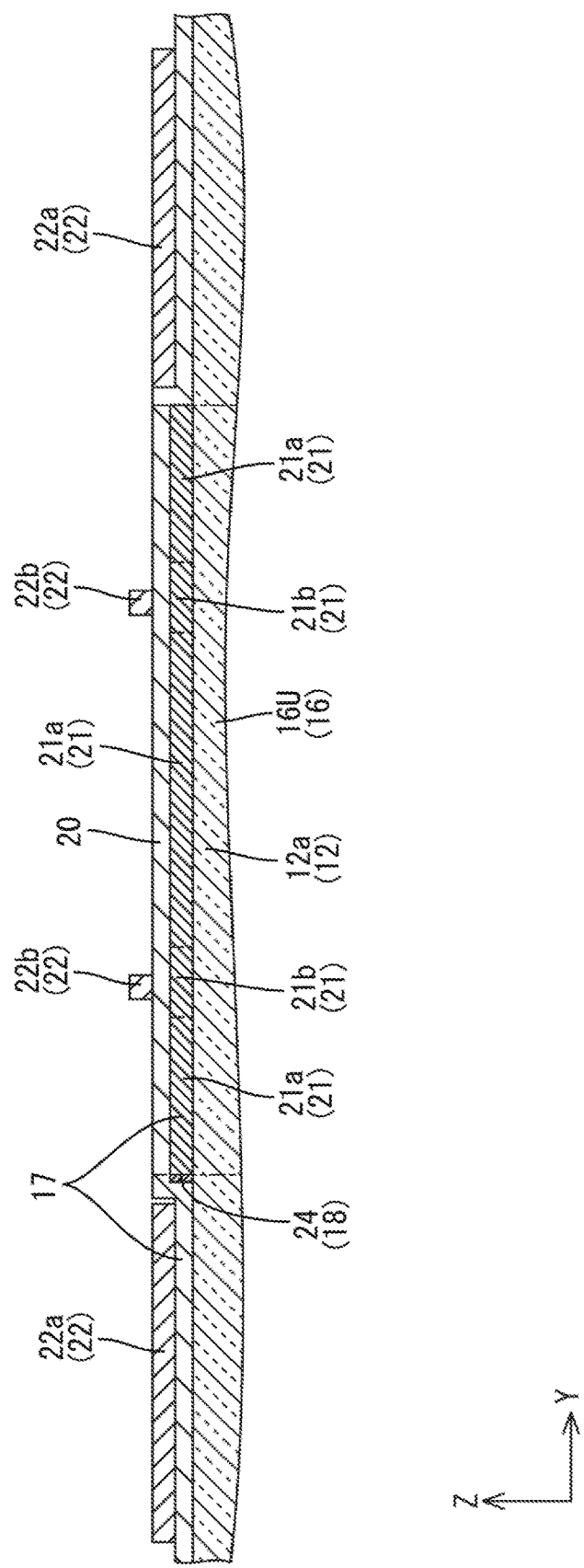
FIG. 6 is a cross-sectional view along line vi-vi in FIG. 5.
Figure 7:
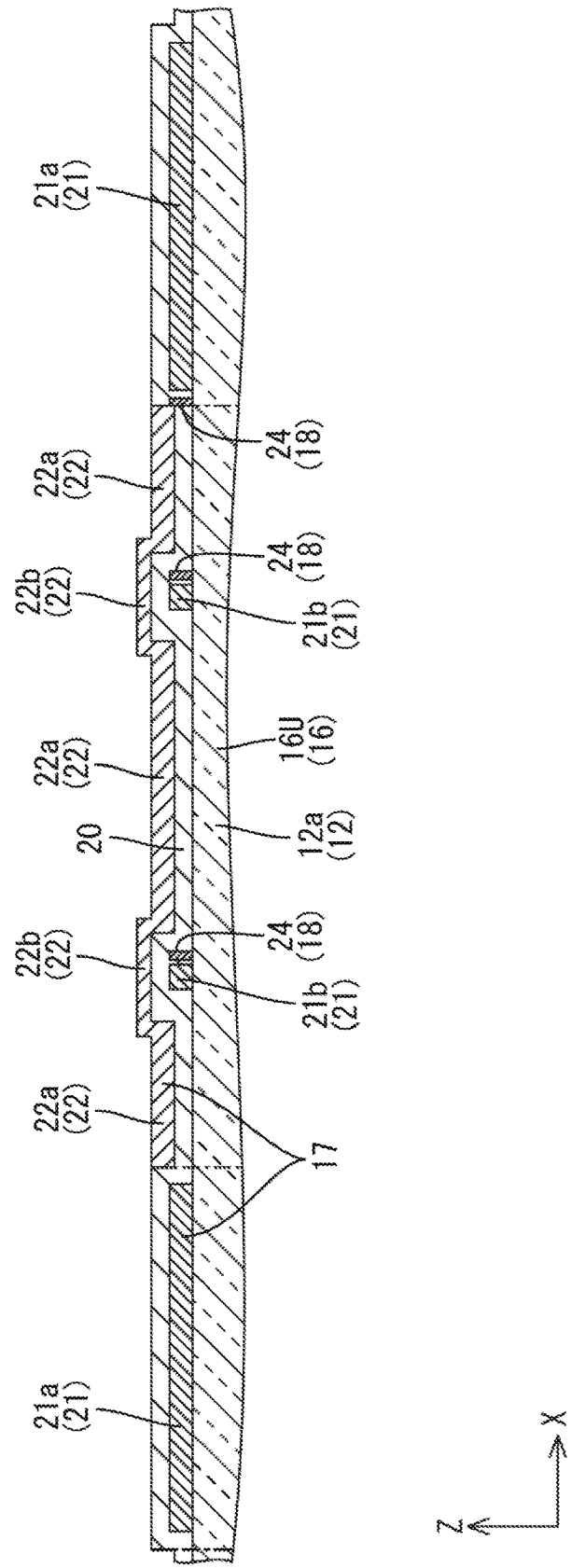
FIG. 7 is a cross-sectional view along line vii-vii in FIG. 5.

Namely, the first electrodes 21 and the second electrodes 22 are arranged in a matrix with the arrangement directions are perpendicular to each other. As illustrated in FIGS. 6 and 7, the first electrodes 21 are directly formed on the plate surface of the base 16 and located in the lowest layer. The insulating layers 20 are solid layers that are laid on the first electrodes 21. The second electrodes 22 are laid on the insulating layers 20 such that the insulating layers 20 are sandwiched between the first electrodes 21 and the second electrodes 22.

Figure 5:
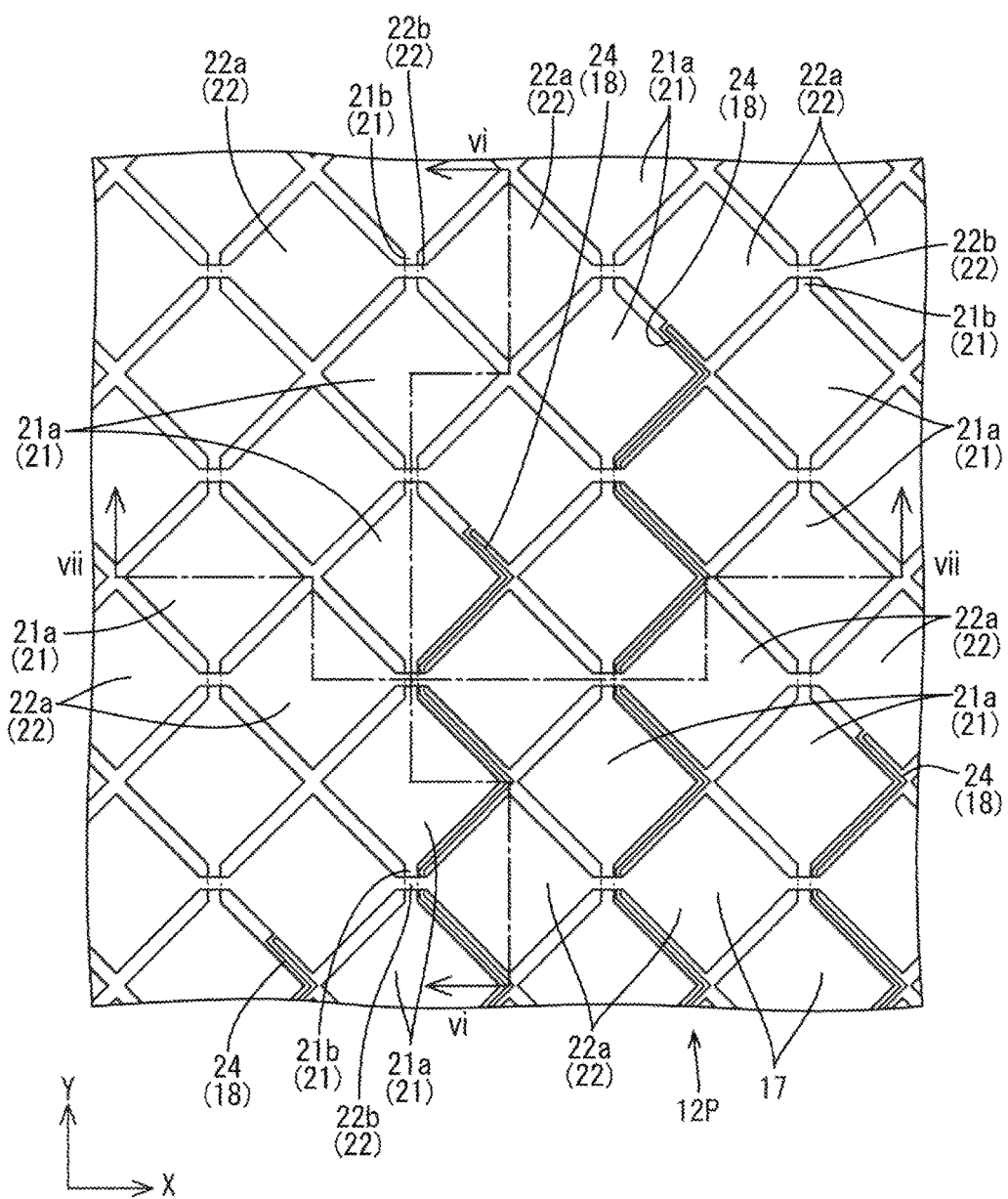
FIG. 5 is a plan view illustrating a planar configuration of a touchscreen pattern.

As illustrated in FIG. 5, the first electrodes 21 includes first unit electrodes (first electrode pads) 21a and first links (first unit electrode interconnecting portions) 21b. The first electrodes 21a are arranged along the Y-axis direction (the first direction). Each of the first links 21b connects the adjacent first unit electrodes 21a. The second electrodes 22 include the second unit electrodes (second electrode pads) 22a and second links (second unit electrode interconnecting portions) 22b. The second unit electrodes 22a are arranged along the X-axis direction (the second direction). Each of the second links 22b connects the adjacent second unit electrodes 22a. The first unit electrodes 21a and the second unit electrodes 22a have a substantially rhombus shape in a plan view. The first unit electrodes 21a and the second unit electrodes 22a are arranged adjacent to one another such that sides thereof are parallel to one another in a plan view, that is, they do not overlap one another within the plate surface of the base 16. More specifically, diagonal lines of the first unit electrodes 21a and the second unit electrodes 22a are parallel to the X-axis direction or the Y-axis direction and the sides thereof are angled relative to the X-axis direction and the Y-axis direction. Each diagonal line joins vertices of the corresponding first unit electrode 21a or the corresponding second unit electrode 22a. Some of the first unit electrodes 21a and the second unit electrodes 22a (arranged in peripheral portions of the effective touching area) have a substantially triangular shape in a plan view. Each of the first links 21b has a line shape extending along the Y-axis direction to connect one vertex to another of the adjacent first unit electrodes 21a with respect to the Y-axis direction. Each of the second links 22b has a line shape extending along the X-axis direction to connect one vertex to another of the adjacent second unit electrodes 22a with respect to the X-axis direction. The first links 21b and the second links 22b are arranged to cross one another. As illustrated in FIGS. 6 and 7, the insulating layers 20 are arranged between the first links 21b and the second links 22b that are perpendicular to one another. Therefore, the first electrodes 21 and the second electrodes 22 are insulated from one another without short circuit.

As illustrated in FIG. 4, the terminals 19 are formed on one of the peripheral portions 12b of the touchscreen 12 on the pressing operation portion 10B. Specifically, the terminals 19 are arranged in an end area of the peripheral portion 12b on the pressing operation portion 10B side with respect to the Y-axis direction opposite from the main portion 12a. Multiple terminals 19 are arranged at regular intervals along the X-axis direction. Namely, a predetermined gap is provided between the terminals 19 and the electrode portions 17 with respect to the Y-axis direction. An end of a flexible circuit board is connected to the terminals 19 via an anisotropic conductive film (the flexible circuit board and the anisotropic conductive film are not illustrated). The other end of the flexible circuit board is connected to the touchscreen control board. According to the configuration, signals can be transmitted between the touchscreen control board and the terminals 19.

As illustrated in FIG. 4, the first lines 23 and the second lines 24 are arranged in a portion of the base 16 between the portion in which the electrode portions 17 that are the effective touching area and the portion in which the terminals 19 are arranged (specifically, a large portion of the peripheral portion of the touchscreen 12 on the pressing operation portion 10B side). Namely, the portion of the base 16 between the portion in which the electrode portions 17 are arranged and the portion in which the terminals 19 are arranged with respect to the Y-axis direction is a common routing area in which the first lines 23 and the second lines 24 are arranged. The first lines 23 and the second lines 24 are routed from the effective touching area side toward the terminals 29 to be collected in the center with respect to the X-axis direction in the common routing area. As illustrated in FIGS. 6 and 7, the first lines 23 are directly formed on the plate surface of the base 16 and arranged in the lowest layer similar to the first electrodes 21. The insulating layers 20 that are solid layers are laid on the first lines 23. The second lines 24 are laid on the insulating layers 20 similar to the second electrodes 22 such that the insulating layers 20 are sandwiched between the first lines 23 and the second lines 24. In FIG. 4, portions of the second lines 24 (other than closer to the terminals 19) are not illustrated.

As illustrated in FIG. 4, in the common routing area, one of ends of each first line 23 is connected to corresponding one of the first unit electrodes 21a of the first electrodes 21 arranged at an end of the arrangement of the first electrodes 21 arranged along the Y-axis direction close to the terminals 19 with respect to the Y-axis direction (the lower end in FIG. 4). The other end of each first line 23 is connected to corresponding one of the terminals 19. The first lines 23 are provided for the first electrodes 21 arranged along the X-axis direction, respectively. The number of the first lines 23 corresponds with the number of the first electrodes 21. The second lines 24 are arranged not only in the common routing area but also in the effective touching area. Namely, the second lines 24 cross the boundary between the common routing area and the effective touching area. As illustrated in FIGS. 4 and 5, one of ends of each second line 24 is connected to corresponding one of the second unit electrodes 22a of the second electrodes 22 arranged along the X-axis direction. The other end of each second line 24 is connected to the corresponding one of the terminals 19. In the effective touching area, a portion of each second line 24 between the ends is routed in a space between the first unit electrode 21a and the second unit electrode 22a that are adjacent to each other. The second lines 24 are provided for the second electrodes 22 arranged along the Y-axis direction, respectively. The number of the second lines 24 corresponds with the number of the second electrodes 22. The second lines 24 connected to the second electrodes 22 at an end of the arrangement of the second electrodes 22 arranged along the Y-axis direction close to the terminals 19 (the closest to the terminals 19) with respect to the Y-axis direction are arranged only in the common routing area. The second lines 24 connected to other second electrodes 22 (the second electrodes 22 that are not the closes to the terminals 19) are routed not only in the common routing area but also in spaces between the adjacent first unit electrodes 21a and second unit electrodes 22a. As illustrated in FIG. 5, portions of the second lines 24 routed in the spaces between the adjacent first unit electrodes 21a and the second unit electrodes 22a repeatedly bend along the respective sides of the first unit electrode 21a and the second unit electrodes 22a in a plan view and forms a zigzag shape.

Figure 8:
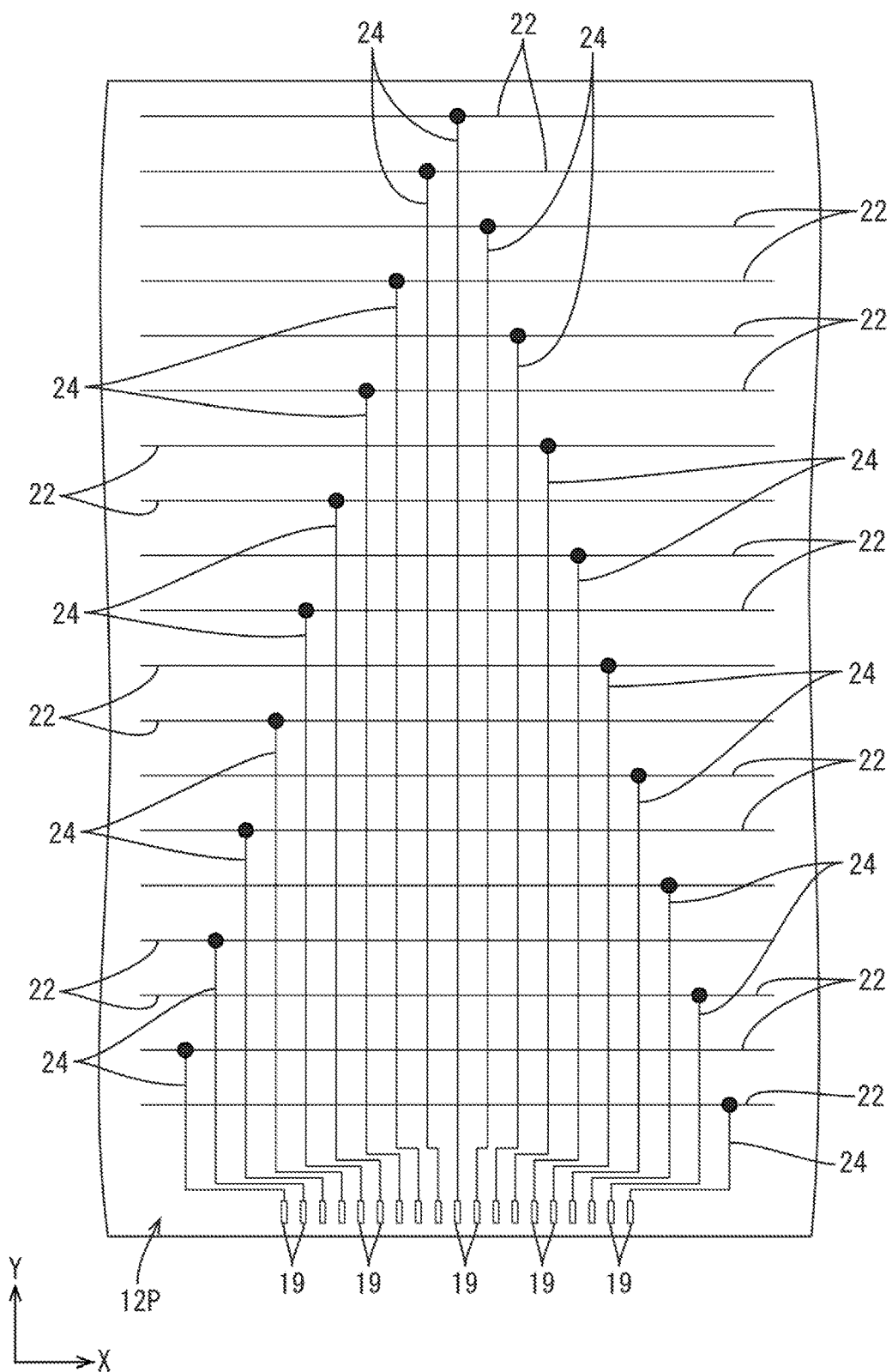
FIG. 8 is a circuit diagram schematically illustrating connection of second lines to second electrodes that form the touchscreen pattern.

As illustrated in FIG. 8, the second line 24 arranged in the middle with respect to the X-axis direction is connected to the second electrode 22 arranged at an end opposite from the terminal 19 side with respect to the Y-axis direction (the farthest from the terminals 19 with respect to the first direction). The second line 24 arranged at one of ends with respect to the X-axis direction is connected to the second electrode 22 arranged closer to the terminals 19 with respect to the Y-axis direction (the closes to the terminals 19 with respect to the first direction). Namely, the second lines 24 connected to the second electrodes 22 farther from the terminals 19 with respect to the Y-axis direction are arranged closer to the middle with respect to the X-axis direction. The second lines 24 connected to the second electrodes 22 closer to the terminals 19 with respect to the Y-axis direction are arranged closer to the ends with respect to the X-axis direction. The second electrodes 22 to which the second lines 24 arranged closer to the middle with respect to the X-axis direction are connected are arranged farther from the terminals 19 with respect to the Y-axis direction. The second electrodes 22 to which the second lines arranged closer to the ends with respect to the X-axis direction are connected are arranged closer to the terminals 19 with respect to the Y-axis direction. FIG. 8 is a drawing schematically illustrating what locations of the second lines 24 are connected to the second electrodes 22 arranged along the Y-axis direction with respect to the X-axis direction.

The liquid crystal display device 10 and the touchscreen 12 according to this embodiment have the configurations described above. A method of producing the touchscreen 12 will be described. The touchscreen 12 having the configuration described above is produced through a pattern forming process, a cutting process, and a three-dimensional shape forming process. The pattern forming process is for forming the touchscreen pattern 12P on the plate surface of the base 16. The cutting process is for cutting a use portion 16U that is to be actually used out of the base 16 on which the touchscreen pattern 12P are formed. The three-dimensional shape forming process is for forming the use portion 16U cut out of the base 16 into a three-dimensional shape. Namely, the base 16 of the touchscreen 12 is larger than the use portion 16U that is actually used before the cutting process is performed. In the cutting process, a portion of the base 16 to be cut out can be defined with a certain level of flexibility.

Figure 9:
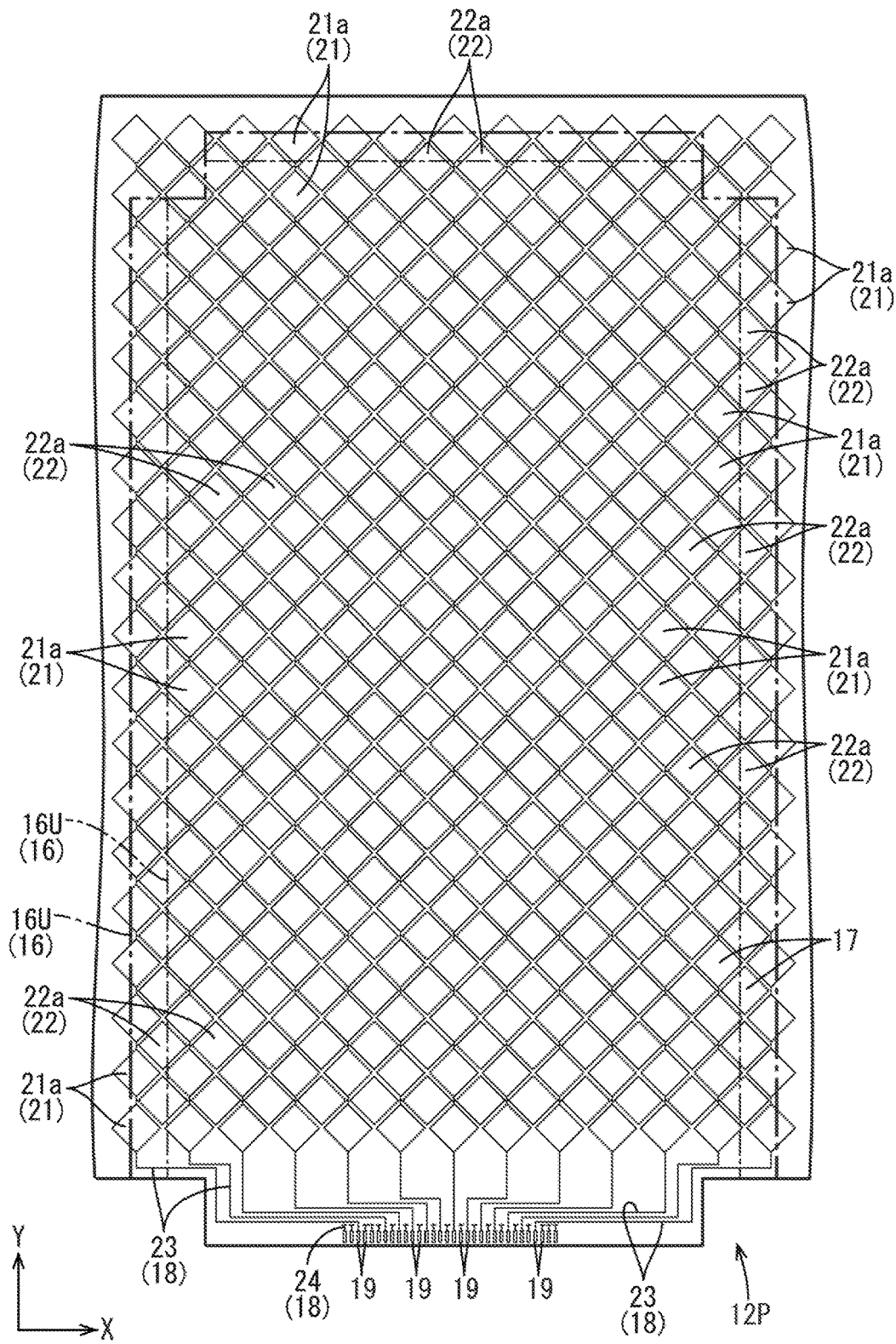
FIG. 9 is a plan view illustrating a substrate before a portion to be used is cut out.

In the pattern forming process, the terminals 19 are formed on the plate surface of the base 16 and then the first electrodes 21 and the first lines 23 are formed in predefined patterns. The ends of the first lines 23 on the terminal 19 side are formed on the terminals 19 and connected although not illustrated. Next, the insulating layers 20 are formed in solid patterns and the second electrodes 22 and the second lines 24 are formed in predefined patterns. Portions of the insulating layers 20 overlapping the specific terminals 19 include contact holes, which are not illustrated. The ends of the second lines 24 on the terminal 19 side are connected to the terminals 19 via the contact holes. As illustrated in FIG. 9, the base 16 used in the pattern forming process is larger than the use portion 16U to be cut out in a plan view. The electrode portions 17, the line portions 18, and the insulating layers 20 are formed in an area of the base 16 larger than the use portion 16U in a plan view. In the pattern forming process, the second lines 24 arranged closer to the middle with respect to the X-axis direction are connected to the second electrodes 22 arranged on the side opposite from the terminals 19 with respect to the Y-axis direction. The second lines 24 arranged at the end with respect to the X-axis direction are connected to the second electrodes 22 arranged closer to the terminals 19 with respect to the Y-axis direction (see FIG. 8).

In the cutting process, the use portion 16U is cut out of the base 16 using a punching machine. The use portion 16U has a flat shape including the main portion 12a and the peripheral portions 12b that continue from the main portion 12a. In FIG. 9, a cutoff line in the base 16 (an outline of the use portion 16U) is indicated with a chain line. Portions of the electrode portions 17 (the first electrodes 21 and the second electrodes 22) and the line portions 18 (the first lines 23 and the second lines 24) of the touchscreen pattern 12P overlapping the cutoff line are cut off along the cutoff line. The second lines 24 connected to the second electrodes 22 are routed to pass through the spaces between the first unit electrodes 21a and the second unit electrodes 22a. Namely, the second lines 24 are routed in the effective touching area. In comparison to a configuration in which the second lines are routed around the effective touching area, the second lines 24 are less likely to be cut during the cutting out of the use portion 16U. Therefore, high flexibility is achieved for defining an area to be cut for the use portion 16U and thus a larger area to be cut can be defined. The plan view of the use portion 16U cut out of the base 16 is illustrated in FIG. 4.

In the three-dimensional shape forming process, portions of the use portion 16U of the base 16 having the flat shape as illustrated in FIG. 4 are bent at the positions indicated with the chain line. Four peripheral portions 12b are bent substantially perpendicular to the rear surface of the main portion 12a as illustrated in FIG. 3. As a result, the touchscreen 12 formed in the three-dimensional shape, that is, the substantially box shape with the opening on the rear side.

Alteration of the three-dimensional shape of the touchscreen 12 can be easily performed by altering the shape of the use portion 16U, that is, altering the area of the base 16 to be cut. For example, to prepare the touchscreen 12 including the peripheral portions 12b with a relatively small width by altering the width of the peripheral portions 12b, the base 16 may be cut along the thinner chain ling in FIG. 9. To prepare the touchscreen 12 including the peripheral portions 12b with a relatively large width, the base 16 may be cut along the thicker chain line in FIG. 9. The touchscreen 12 including the peripheral portions 12b with the small width is suitable for the liquid crystal display device 10 with a small thickness. The touchscreen 12 including the peripheral portions 12b with the large width is suitable for the liquid crystal display device with a large thickness. Namely, the touchscreen 12 can be produced in various three-dimensional shapes from the base 16 of one kind on which the touchscreen pattern 12P is formed by altering the area to be cut. According to the configuration, the production cost can be reduced. Furthermore, even if a complicated three-dimensional shape is required for the touchscreen 12, the touchscreen 12 can be easily prepared by properly defining the area of the base 16 to be cut. Namely, flexibility in designing the three-dimensional shapes of the touchscreen 12 to be produced improves.

As described above, the method of producing the touchscreen (the position input device) 12 according to this embodiment includes the pattern forming process, the cutting process, and the three-dimensional shape forming process. The pattern forming process is for forming the touchscreen pattern (the position input pattern) 12P including at least the electrode portions 17 and the line portions 18 on the plate surface of the base 16 that has a sheet shape with flexibility. The cutting process is for cutting the use portion 16U out of the base 16 on which the touchscreen pattern 12P is formed. The three-dimensional shape forming process is for forming the use portion 16U cut out of the base 16 into the three-dimensional shape.

In the pattern forming process, the touchscreen pattern 12P including at least the electrode portions 17 and the line portions 18 on the plate surface of the base 16. In the cutting process, the use portion 16U used for the touchscreen 12 is cut out of the base 16 on which the touchscreen pattern 12P is formed. In the three-dimensional shape forming process, the use portion 16U that is cut out of the base 16 having the sheet shape with flexibility is formed into the three-dimensional shape. Through the processes, the touchscreen 12 in the predefined shape is prepared.

Alteration of the three-dimensional shape of the touchscreen 12 can be easily performed by altering the shape of the use portion 16U, that is, altering the portion of the base 16 to be cut. Namely, the touchscreen 12 can be produced in various three-dimensional shapes from one kind of the base 16 on which the touchscreen pattern 12P is formed by altering the portion to be cut. According to the configuration, the production cost can be reduced. Furthermore, even if a complicated three-dimensional shape is required for the touchscreen 12, the touchscreen 12 can be easily prepared by properly defining the area of the base 16 to be cut. Namely, flexibility in designing the three-dimensional shapes of the touchscreen 12 increases.

In the pattern forming process, the touchscreen pattern 12P is formed on the plate surface of the base 16. The touchscreen pattern 12P includes the electrode portions 17, the insulating layers 20, the terminals 19, and the line portions 18. The electrode portions 17 include the first electrodes 21 arranged along the plate surface of the base 16 and the X-axis direction (the second direction) perpendicular to the Y-axis direction. The first electrodes 21 include the first unit electrodes 21a arranged along the Y-axis direction (the first direction) along the plate surface of the base 16. The first unit electrodes 21a are linked one another. The electrode portions 17 further include the second electrodes 22 arranged along the Y-axis direction. The second electrodes 22 include the second unit electrodes 22a arranged along the X-axis direction and adjacent to the first unit electrodes 21a in a plan view. The second unit electrodes 22a are linked one another. The insulating layers 20 are arranged between the first electrodes 21 and the second electrodes 22 that cross one another for insulating the first electrodes 21 and the second electrodes 22. The terminals 19 are arranged on one side of the base 16 with respect to the Y-axis direction. The line portions 18 include the first lines 23 extend from the first unit electrodes 21a of the first electrodes 21 located at the end closer to the terminals 19. The ends of the first lines 23 are connected to the terminals 19. The line portions 18 further include the second lines 24 extend from the second unit electrodes 22. The ends of the second lines 24 are connected to the terminals 19. The second lines 24 are routed in spaces between the adjacent first unit electrodes 21a and second unit electrodes 22a in a plan view. According to the configuration, the first electrodes 21 including the first unit electrodes 21a arranged along the Y-axis direction and linked one another cross the second electrodes 22 including the second unit electrodes 22a arranged along the X-axis direction perpendicular to the Y-axis direction and linked one another. However, the first electrodes 21 are insulated from the second electrodes 22 with the insulating layers 20. The ends of the first lines 23 extending from the first unit electrodes 21a of the first electrodes 21 are connected to the terminals 19. Therefore, signals are transmitted to the first electrodes 21 through the terminals 19. The ends of the second lines 24 extending from the second electrodes 22 are connected to the terminals 19. Therefore, signals are transmitted to the second electrodes 22 through the terminals 19. Furthermore, the second lines 24 are routed in the spaces between the adjacent first unit electrodes 21a and second unit electrodes 22a. In comparison to the configuration in which the second lines are routed around the electrode portions 17, the area of the base 16 that can be cut out in the cutting process increases. According to the configuration, higher flexibility is provided in designing of the shape of the use portion 16U to be cut out of the base 16, that is, the three-dimensional shape of the touchscreen 12.

In the pattern forming process, the second lines 24 connected to the second electrodes 22 located farther from the terminals 19 are arranged closer to the middle with respect to the Y-axis direction. The second lines 24 connected to the second electrodes 22 closer to the terminals 19 are arranged closer to the end with respect to the Y-axis direction. According to the configuration, the second lines 24 are arranged closer to the end of the base 16 with respect to the Y-axis direction. The second lines 24 are not arranged at the end of the base 16 opposite from the terminals 19 with respect to the Y-axis direction. Corner portions of the base 16 on the end opposite from the terminals 19 with respect to the Y-axis direction can be cut in the cutting process. Therefore, the area to be cut out can be more flexibly altered. The touchscreen 12 can be produced in various three-dimensional shapes. The use portion 16U that is cut out of the base 16 may be formed in a ridged shape in a plan view. The flexibility in designing the shape of the use portion 16U that is cut out of the base 16, that is, the three-dimensional shape of the touchscreen 12 further increases.

In the cutting process, the use portion 16U is cut out such that the main portion 12a including the central portion of the base 16 and the peripheral portions 12b including the end portions of the base 16 continue from each other. In the forming process, the use portion 16U is formed into the three-dimensional shape such that the plate surfaces of the peripheral portions 12b are perpendicular to the plate surface of the main portion 12a. This is preferable for producing the touchscreen 12 including the peripheral portions 12b formed into the three-dimensional shape with the plate surfaces perpendicular to the plate surface of the main portion 12a.

<Second Embodiment>

A second embodiment will be described with reference to FIGS. 10 to 12. The second embodiment includes touchscreen pattern 112P that is different from that of the first embodiment. Configurations, operations, and effects similar to those of the first embodiment will not be described.

Figure 10:
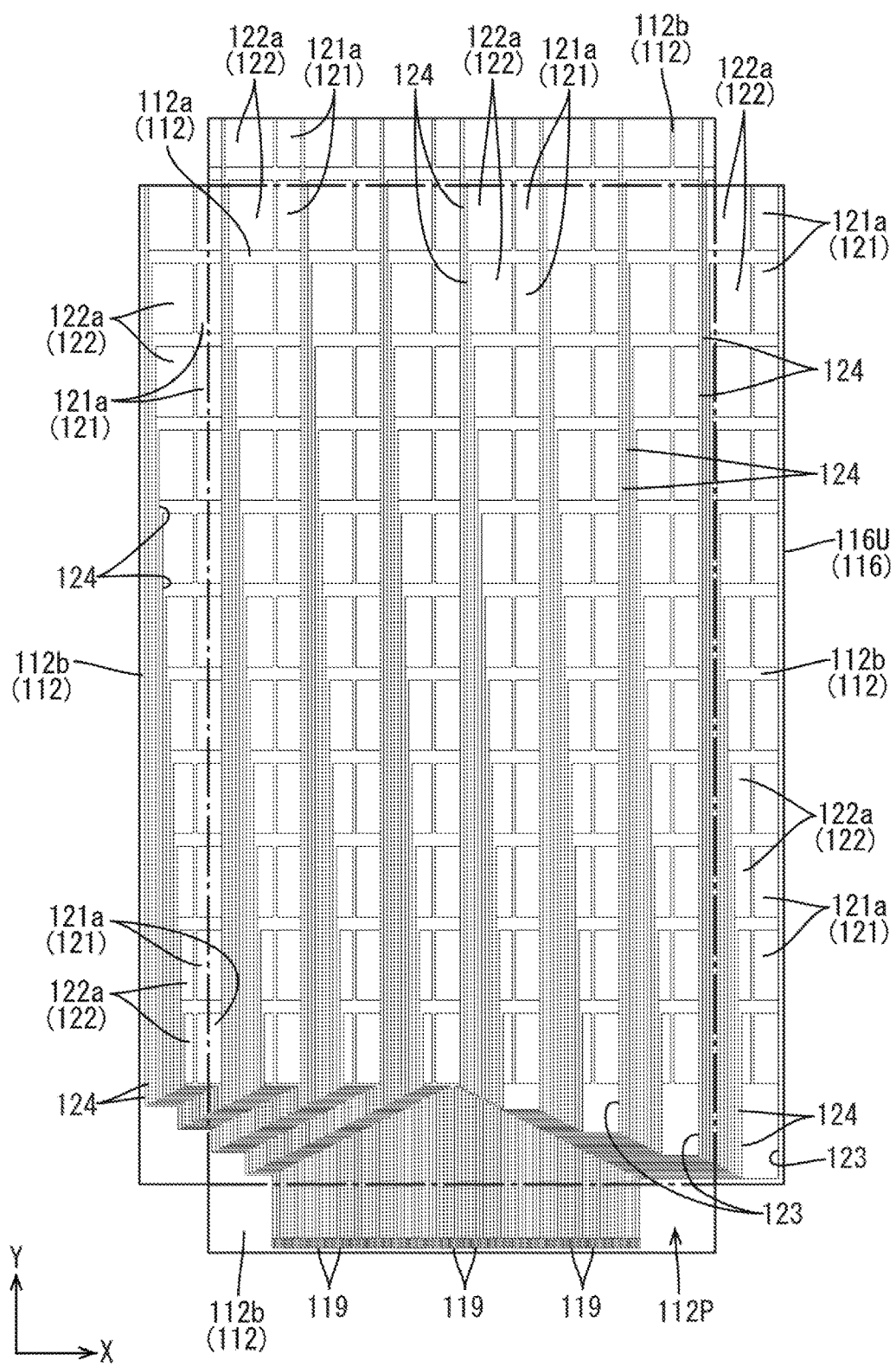
FIG. 10 is a developed view of a touchscreen according to a second embodiment of the present invention.
Figure 11:
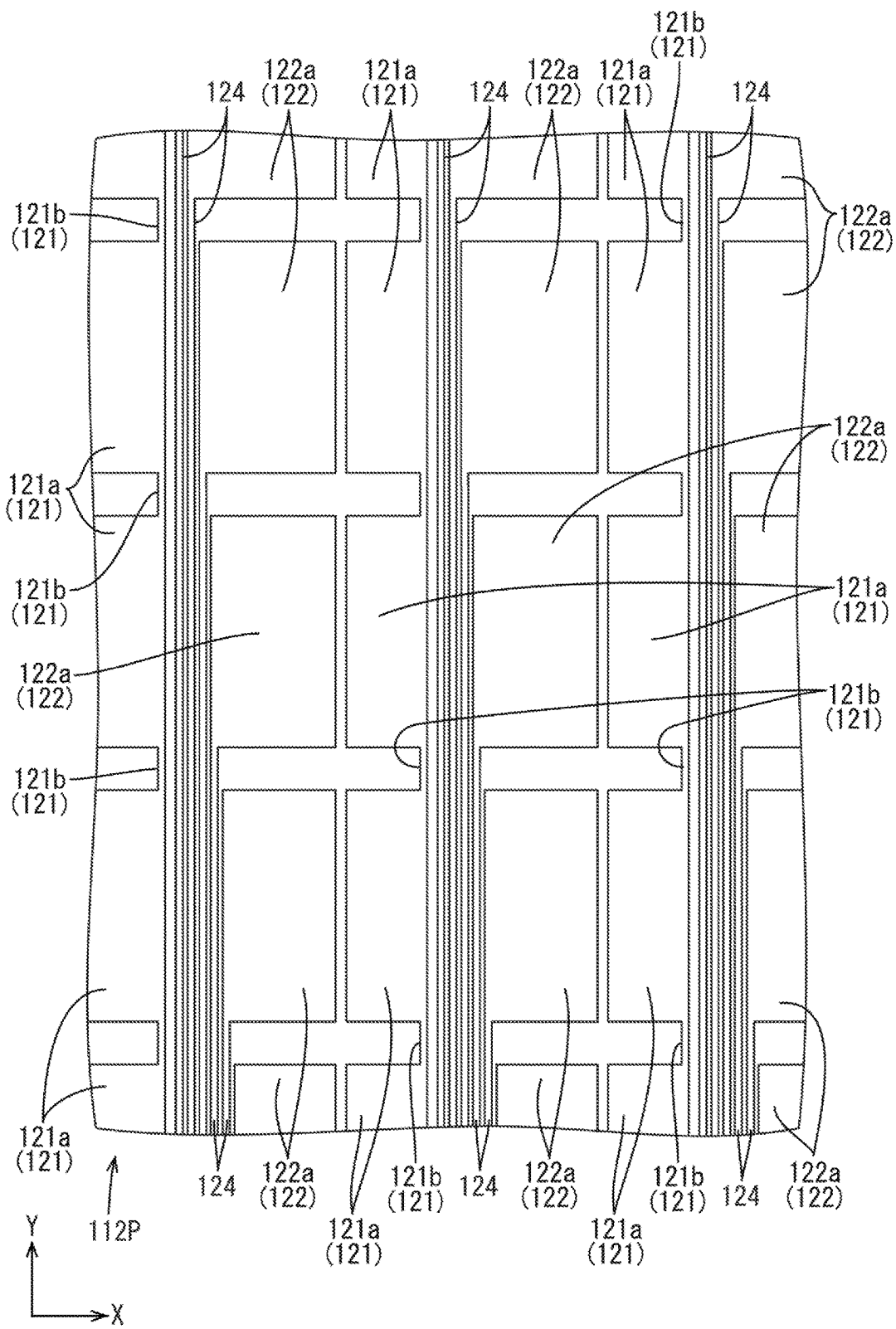
FIG. 11 is a plan view illustrating a planar configuration of a touchscreen pattern.

As illustrated in FIG. 10, the touchscreen pattern 112P according to this embodiment includes first electrodes 121 and second electrodes 122 arranged along the Y-axis direction (the first direction). Lines of the first electrodes 121 and lines of the second electrodes 122 are arranged along the X-axis direction (the second direction). The first electrodes 121 and the second electrodes 122 are alternately and repeatedly arranged with respect to the X-axis direction. The first electrodes 121 include first unit electrodes 121a arranged along the Y-axis direction and first links 121b for connecting the first unit electrodes 121a that are adjacently arranged with respect to the Y-axis direction. The first unit electrodes 121a that are adjacently arranged with respect to the Y-axis direction are electrically connected with each other via the first links 121b and thus they are at the same potential. Each of the first unit electrodes 121a has a vertically long rectangular in a plan view with a long-side direction corresponding with the Y-axis direction and a short-side direction corresponding with the X-axis direction. The first links 121*b* are arranged to continue from ends of the first unit electrodes 121*a* opposite from the second unit electrodes 122*a* corresponding to the first unit electrodes 121*a* with respect to the X-axis direction.

The second electrodes 122 include the second unit electrodes 122*a* arranged along the Y-axis direction. The second unit electrodes 122*a* adjacently arranged with respect to the Y-axis direction are electrically independent from each other. This embodiment does not include the second links 22*b* (see FIG. 5) included in the first embodiment. Each of the second unit electrodes 122*a* has a vertically long rectangular shape in a plan view similar to the first unit electrodes 121*a*. The arrangement of the second unit electrodes 122*a* with respect to the long-side direction (the Y-axis direction, the first direction) corresponds with that of the first unit electrodes 121*a*. Namely, the first unit electrodes 121*a* and the second unit electrodes 122*a* are arranged along the X-axis direction with the long sides thereof opposed to one another. The closer the second unit electrodes 122*a* arranged along the Y-axis direction to terminals 119, the shorter the short sides thereof with respect to the Y-axis direction. The farther the second unit electrodes 122*a* from the terminals 119, the longer the short sides thereof with respect to the Y-axis direction. The second electrodes 122 having the configuration described above are driving electrodes configured to generate electric fields. The first electrodes 121 are detecting electrodes configured to detect the electric fields generated by the second electrodes 122 that are the driving electrodes. Each of the first electrodes 121 and the second electrode 122 that is adjacent to the first electrode 121 with respect to the X-axis direction forms a touch sensor. An area in which the first electrodes 121 and the second electrodes 122 are arranged corresponds with the effective touching area. In FIGS. 10 to 12, the electrodes 121, 122, the lines 123, 124, and the terminals 119 are schematically illustrated and thus actual dimensions and arrangements thereof in a plan view are smaller and denser than those in the drawings.

First lines 123 are arranged in a common routing area between the effective touching area and the terminals 119 with respect to the Y-axis direction. Ends of the first lines 123 on one side are connected to the first unit electrodes 121*a* arranged at an end closer to the terminals 119 with respect to the Y-axis direction (the lowest in FIG. 10) among the first unit electrodes 121*a* included in the first electrodes 121 and arranged along the Y-axis direction. Ends of the first lines 123 on the other side are connected to the terminals 119. The first lines 123 are provided for the first electrodes 121 arranged along the X-axis direction, respectively. The number of the first lines 123 and the number of the first electrodes 121 are equal to each other.

Second lines 124 are arranged in the effective touching area in addition to the common routing area to cross a boundary between the common routing area and the effective touching area. As illustrated in FIGS. 10 and 11, ends of the second lines 124 on one end are connected to the second unit electrodes 122*a* arranged along the Y-axis direction. Ends of the second lines 124 on the other side are connected to the terminals 119. Portions of the second lines 124 between the ends are routed in spaces between the first unit electrodes 121*a* and the second unit electrodes 122*a* that area adjacent to each other with respect to the X-axis direction in the effective touching area. The second lines 124 are provided for the second unit electrodes 122*a* arranged along the Y-axis direction, respectively. The number of the second lines 124 for a single second electrode 122 is equal to the number of the second unit electrodes 122*a* in the second electrode 122. The total number of the second lines 124 is equal to the total number of the second unit electrodes 122*a* (calculated by multiplying the number of the second electrodes 122 by the number of the unit electrodes 122*a* including in the single second electrode 122). The second lines 124 are arranged to extend from the ends of the second unit electrodes 122*a* opposite from the first unit electrodes 121*a* corresponding to the second unit electrodes 122*a* with respect to the X-axis direction. The second lines connected to the second unit electrodes 122*a* in the single second electrode 122 are arranged adjacent to each other with respect to the X-axis direction. The second lines 124 are sandwiched between the second electrodes 122 to which the second lines 124 are connected and the first electrodes 121 located on the opposite side of the second electrodes 122 relative to the first electrodes that correspond to the second electrodes 122. The farther the second lines 124 connected to the single second electrode 122 from the terminals 119 with respect to the Y-axis direction, the smaller the number of the second lines 124 arranged along the X-axis direction. The closer the second lines 124 to the terminals 119, the larger the number of the second lines 124 arranged along the X-axis direction. The second lines 124 arranged along the X-axis direction and closer to the second electrodes 122 with respect to the X-axis direction are connected to the second unit electrodes 122*a* closer to the terminals 119 with respect to the Y-axis direction. The second lines 124 farther from the second electrodes 122 with respect to the X-axis direction (closer to the adjacent first electrode 121) are connected to the second unit electrodes 122*a* farther from the terminals 119 with respect to the Y-axis direction.

The first electrodes 121, the second electrodes 122, the first lines 123, and the second lines 124 are formed in the same layer (a single layer) on a plate surface of a base 116. The touchscreen 112 according to this embodiment does not include the insulating layer 20 (see FIGS. 6 and 7) included in the first embodiment. The first electrodes 121, the second electrodes 122, the first lines 123, and the second lines 124 of the touchscreen pattern 112P do not overlap (or cross) one another.

The touchscreen 112 having the above configuration is produced through a pattern forming process, a cutting process, and a three-dimensional shape forming process. In the pattern forming process, the terminals 119 are formed on the plate surface of the base 116 and then the first electrodes 121, the second electrodes 122, the first lines 123, and the second lines 124 are formed in a predefined pattern. The first electrodes 121, the second electrodes 122, the first lines 123, and the second lines 124 of the touchscreen pattern 112P can be collectively formed by the same manufacturing device. In comparison to the first embodiment, the production cost and tact time regarding the pattern forming process can be reduced.

Figure 12:
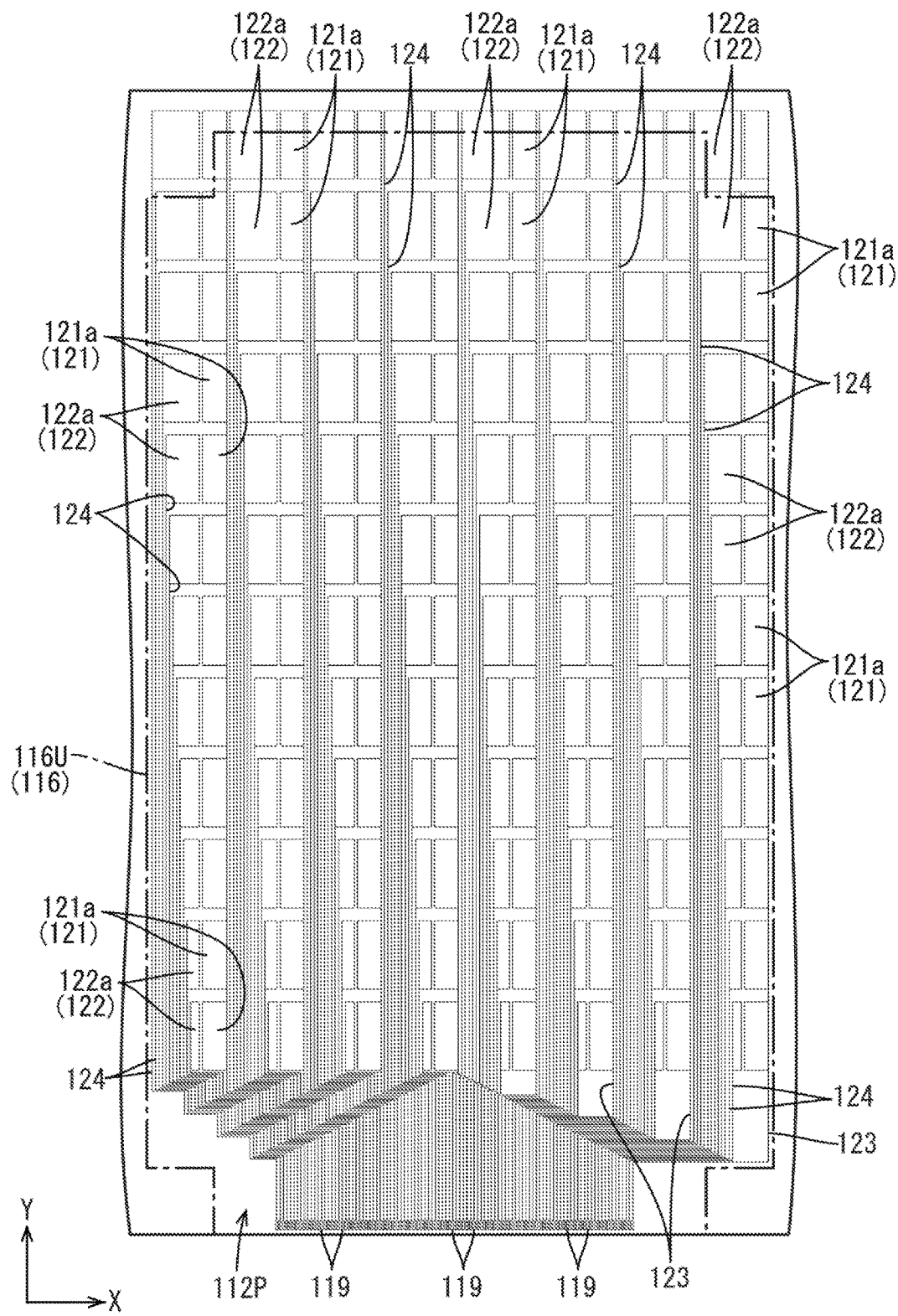
FIG. 12 is a plan view illustrating a substrate before a portion to be used is cut out.

In the cutting process, a use portion 116U is cut out of the base 116 along the cutoff line indicated with the chain line in FIG. 12 using the punching machine. Through the process, the use portion 116U including a main portion 112*a* and peripheral portions 112*b* that continue from the main portion 112*a* in the flat shape is prepared. Through the cutting, the portions of the first electrodes 121 and the second electrodes 122 included in the touchscreen pattern 112P and the first lines 123 and the second lines 124 outside the cutoff line are cut off along the cutoff line. The second lines 124 connected to the respective second unit electrodes 122a included in the second electrodes 122 are routed between the first electrodes 121 and the second electrodes 122. Namely, the second lines 124 are routed in the effective touching area. In comparison to a configuration in which the second lines are routed around the effective touching area, the second lines 124 are less likely to be cut. Namely, the flexibility in designing the area of the use portion 116U increases and thus a larger area of the use portion 116U can be defined. The plan-view shape of the use portion 116U cut out of the base 116 is illustrated in FIG. 10. The three-dimensional shape forming process and the three-dimensional shape of the touchscreen 112 are similar to those of the first embodiment (see FIG. 2).

According to the embodiment, in the pattern forming process, the touchscreen pattern 112P including the first electrodes 121, the second electrodes 122, the terminals 119, the first lines 123, and the second lines 124 is formed on the plate surface of the base 116. The first electrodes 121 included in the electrode portions include the first unit electrodes 121a arranged along the Y-axis direction (the first direction) along the plate surface of the base 116. The first unit electrodes 121a are linked one another. The lines of the first electrodes 121 are arranged along the X-axis direction (the second direction) perpendicular to the Y-axis direction. The second electrodes 122 included in the electrode portions include the second unit electrodes 122a arranged along the Y-axis direction and adjacent to the respective first unit electrodes 121a with respect to the X-axis direction. The lines of the second electrodes 122 are arranged along the X-axis direction. The terminals 119 are arranged at the end of the base 116 with respect to the Y-axis direction. The first lines 123 included in the line portions extend from the respective first unit electrodes 121a of the first electrodes 121 arranged at the end close to the terminals 119. The ends of the first lines 123 are connected to the terminals 119. The second lines 124 included in the line portions extend from the respective second unit electrodes 122a. The ends of the second lines 124 are connected to the terminals 119. The second lines 124 are routed between the first unit electrodes 121a and the second unit electrodes 122a arranged adjacent to each other with respect to the X-axis direction. According to the configuration, the ends of the first lines 123 extending from the first unit electrodes 121a arranged at the end closer to the terminals 119 are connected to the terminals 119. Therefore, signals are transmitted from the terminals 119 to the first electrodes 121 including the first unit electrodes 121a arranged along the Y-axis direction and linked one another. The ends of the second lines 124 extending from the second unit electrodes 122a included in the second electrodes arranged along the X-axis direction perpendicular to the Y-axis direction are connected to the respective terminals 119. Therefore, signals are transmitted from the terminals 119 to the second electrodes 122. The second lines 124 are routed between the first unit electrodes 121a and the second unit electrodes 122a that are adjacent to each other with respect to the X-axis direction. In comparison to the configuration in which the second lines are routed around the electrode portions, a larger portion of the base 116 can be cut out in the cutting process. According to the configuration, the flexibility in designing the shape of the use portion 116U cut out of the base 116, that is, the three-dimensional shape of the touchscreen 112 increases.

In the pattern forming process, the second electrodes 122 are formed as driving electrodes that generate electric fields and the first electrodes 121 are formed as detecting electrodes that detect the electric fields generated by the driving electrodes. The first electrodes 121 include the first unit electrodes 121a that are linked one another and connected to the terminals 119 via the first lines 123. The second unit electrodes 122a of second electrodes 122 are connected to the respective terminals 119 via the second lines. The second electrodes 122 are the driving electrodes and the first electrodes 121 are the detecting electrodes. Therefore, if the user brings his or her finger closer to the position detecting device and any of the electric fields generated by the second unit electrodes 122a is absorbed, intensity of the electric fields detected by the detecting electrodes varies. An input position is detected based on in what second unit electrode 122a such a variation in intensity of the electric fields occurs.

<Third Embodiment>

A third embodiment will be described with reference to FIGS. 13 to 16. The third embodiment includes a touchscreen 212 having a three-dimensional shape different from that of the second embodiment. Configurations, operations, and effects similar to those of the second embodiment will not be described.

Figure 13:
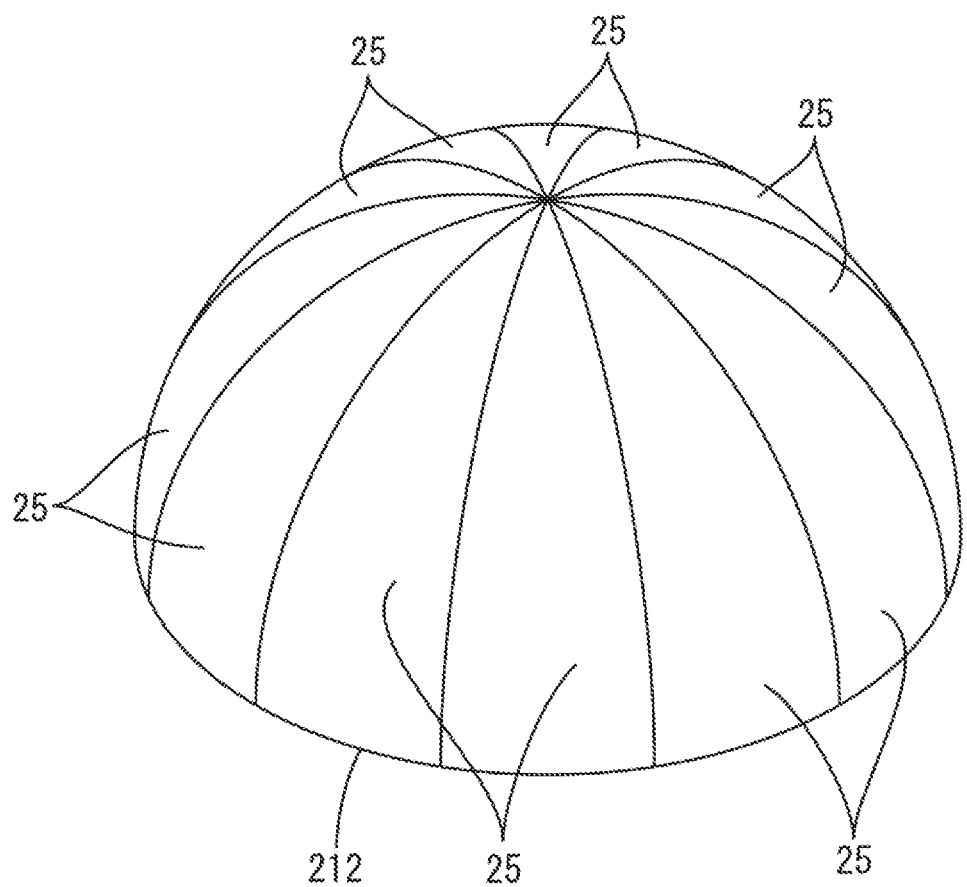
FIG. 13 is a perspective view schematically illustrating a touchscreen in a three-dimensional shape according to a third embodiment of the present invention.

As illustrated in FIG. 13, the touchscreen 212 according to this embodiment has a hemispherical shape (a dome shape), that is, a three-dimensional shape. The touchscreen 212 is not used for the liquid crystal display device such as the first embodiment and the second embodiment. The touchscreen 212 is used for a remote controller for remotely controlling electronic devices (e.g., a car navigation system, a car audio system, a television set, and an air-conditioner). The touchscreen 212 does not require light transmissivity. In FIG. 13, a touchscreen pattern 212P is not illustrated.

Figure 14:
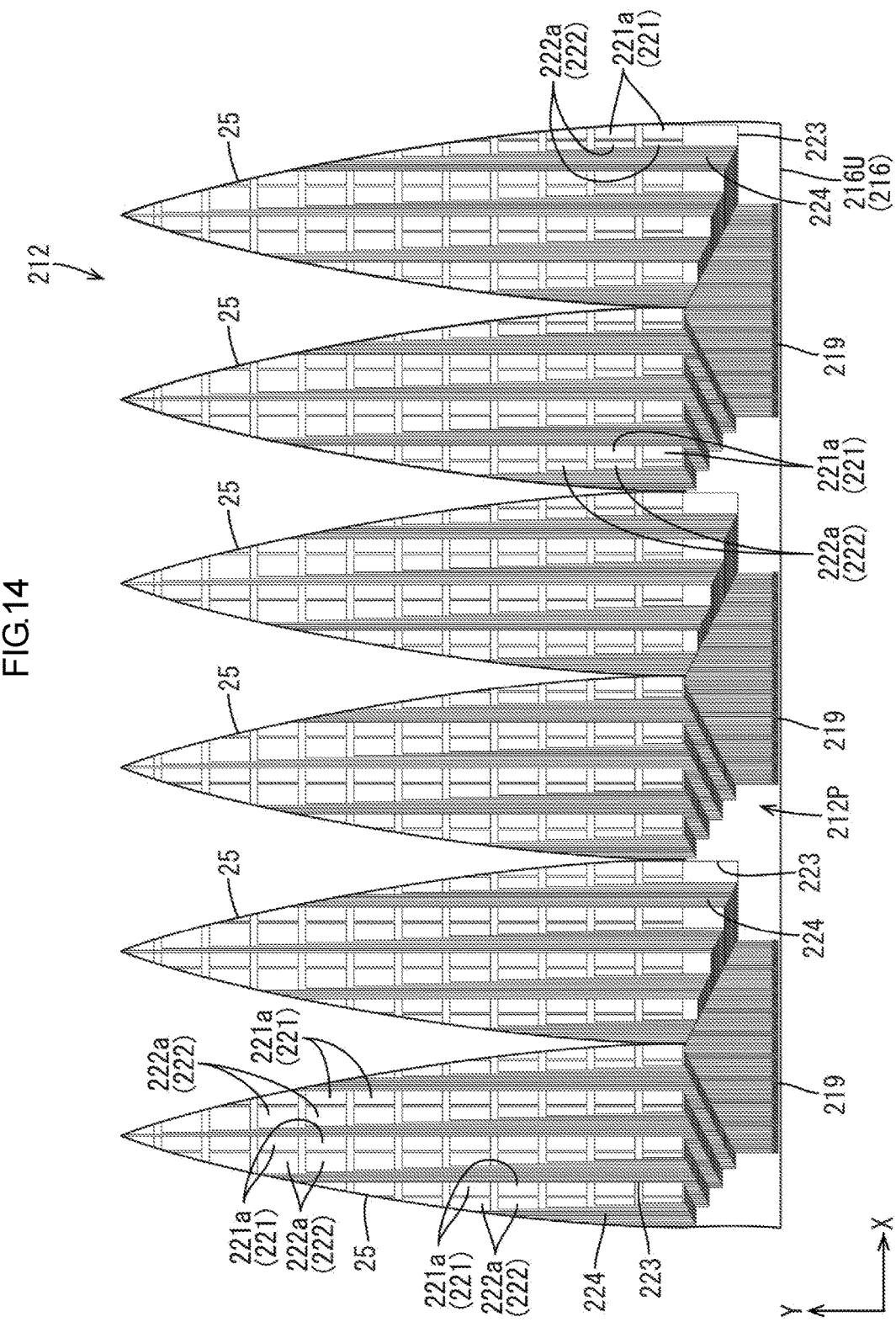
FIG. 14 is a developed view of a touchscreen.
Figure 15:
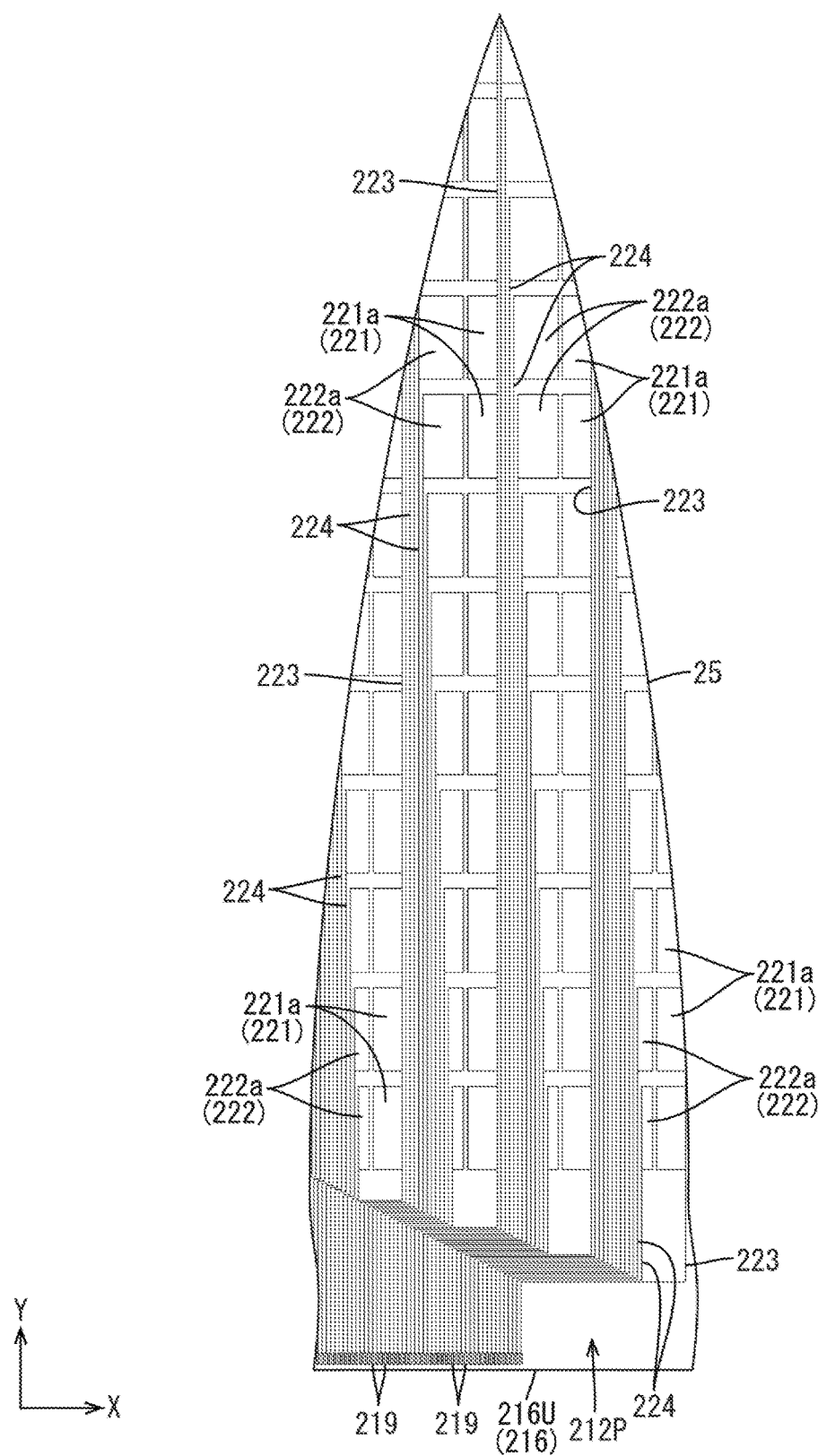
FIG. 15 is a magnified plan view of triangular portions.

A shape of the touchscreen 212 when the touchscreen 212 is developed or before formed into the hemispherical shape is illustrated in FIG. 14. The touchscreen pattern 212P of the touchscreen 212 is similar to that of the second embodiment. However, a plan-view shape of a base 216 on which the touchscreen pattern 212P is formed is different. The base 216 includes triangular portions 25, each of which has a width that decreases as a distance from terminals 219 increases with respect to the Y-axis direction (the first direction). The triangular portions 25 are arranged along the X-axis direction (the second direction). The triangular portions 25 include wide portions that are connected with one another. As illustrated in FIG. 15, each of the triangular portions 25 is larger on a side close to the terminal 219, that is, a side on which a larger number of second lines 224 are arranged with respect to the X-axis direction and smaller on a side farther from the terminal 219, that is, a side on which a smaller number of the second lines 224 are arranged with respect to the X-axis direction. Outer edges of each triangular portion 25 curve outward to form a bow shape (an arch shape). The terminals 219 are provided for every two triangular portions 25.

Figure 16:
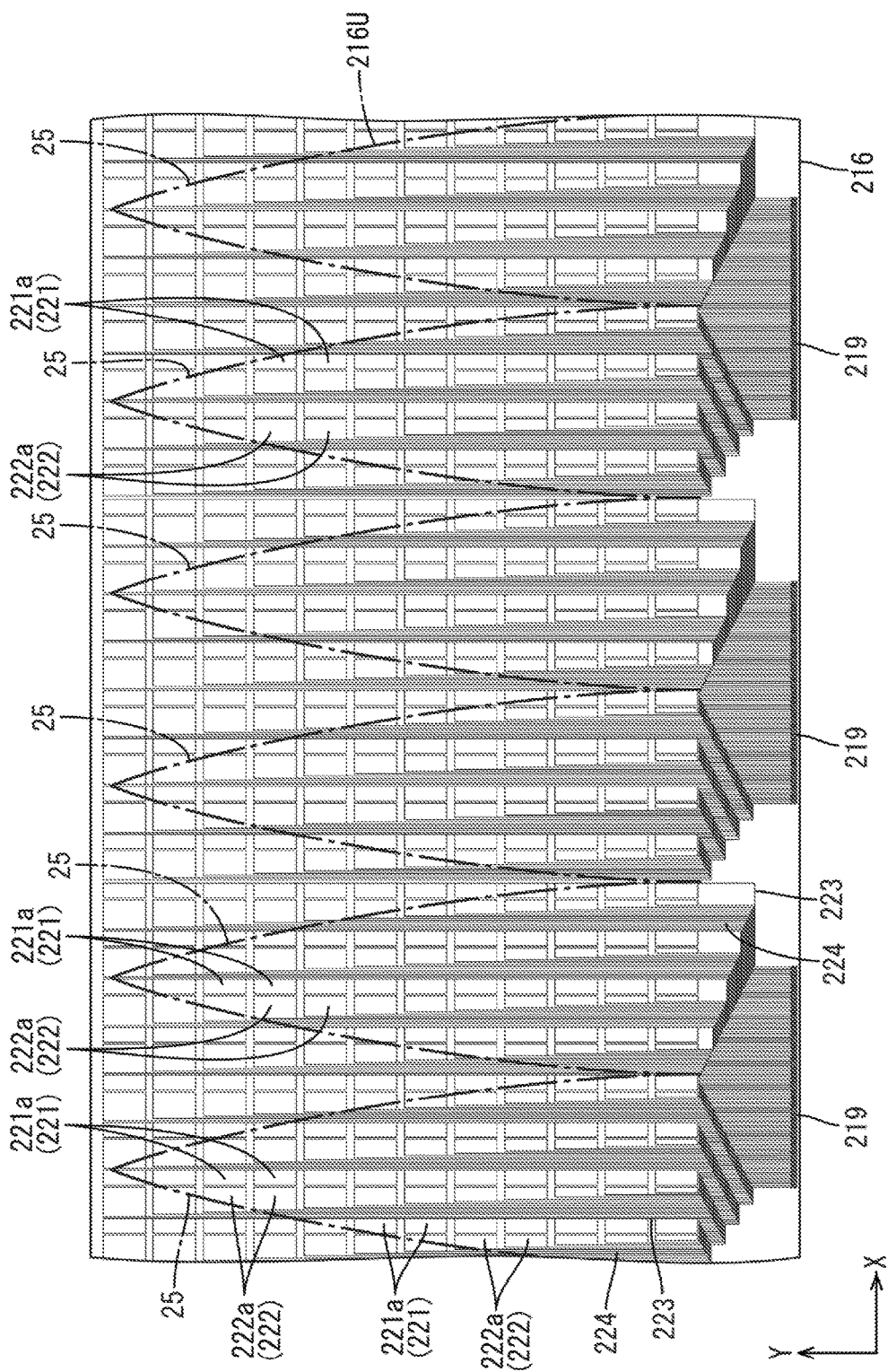
FIG. 16 is a plan view illustrating a substrate before a portion to be used is cut out.

Second unit electrodes 222a arranged closer to the outer edges of the triangular portions 25 include those that are cut along the outlines of the triangular portions 25. The second lines 224 connected to the second unit electrodes 222a that are cut extend from the second unit electrodes 222a toward the terminals 219, that is, toward the wide portions of the triangular portions 25 and thus the second lines 224 are less likely to be cut before reaching the terminals 219. In the cutting process included in the manufacturing of the touchscreen 12, as illustrated in FIG. 16, the second unit electrodes 222a outside the cutoff line are cut off when cutting a use portion 216U out of the base 216 (a series of the triangular portions 25). However, the cutoff line is less likely to cross the second lines 224 connected to the second unit electrodes 222a that are cut. Therefore, the second lines 224 are less likely to be broken. The second unit electrodes 222a that are cut can be used as driving electrodes. First unit electrodes 221a outside the cutoff line are cut off. However, the connection between the first unit electrodes 221a that are cut and the terminals 219 is more likely to be maintained with first links 221b extending from the first unit electrodes 221a that are cut toward the terminals 219 via the first unit electrodes 221a adjacent to the terminals 219. Therefore, the first unit electrodes 221a can be used as detecting electrodes. According to the configuration, the outlines of the triangular portions 25 (curvature and length of the curved outer edges) can be freely defined. Furthermore, an effective touching area of the touchscreen 212 formed in the dome shape can be defined as large as possible. In FIGS. 14 to 16, the electrodes 221 and 222 and the lines 223 and 224 are schematically illustrated. Actual sizes of those in a plan view are smaller than illustrated and actual arrangement is denser than illustrated. Some of the first unit electrodes 221a and the second unit electrodes 222a are separated from the terminals 219. However, those take only a small portion of an entire touchscreen pattern 212P and thus are less likely to affect the detection of position inputs.

In the three-dimensional shape forming process performed after the cutting process described above, end portions of the triangular portions 25 included in the use portion 216U of the base 216 and located at ends with respect to the X-axis direction are joined together. Furthermore, the use portion 216U is formed in the three-dimensional shape with the triangular portions 25 curved and vertices of the triangular portions 25 at the center. In the three-dimensional shape forming process, a jig having a hemispherical shape is used. The use portion 216U of the base 216 is placed on an outer surface of the jig and easily formed into the three-dimensional shape.

According to this embodiment, in the cutting process, the use portion 216U is cut out of the base 216 such that the triangular portions 25 having the wider portions on the terminal 219 side with respect to the Y-axis direction (the first direction) in a plan view are arranged along the X-axis direction (the second direction) and linked. In the forming process, the use portion 216U is formed into the hemisphere shape. The processes are preferable for producing the touchscreen 12 having the hemisphere shape.

<Fourth Embodiment>

Figure 17:
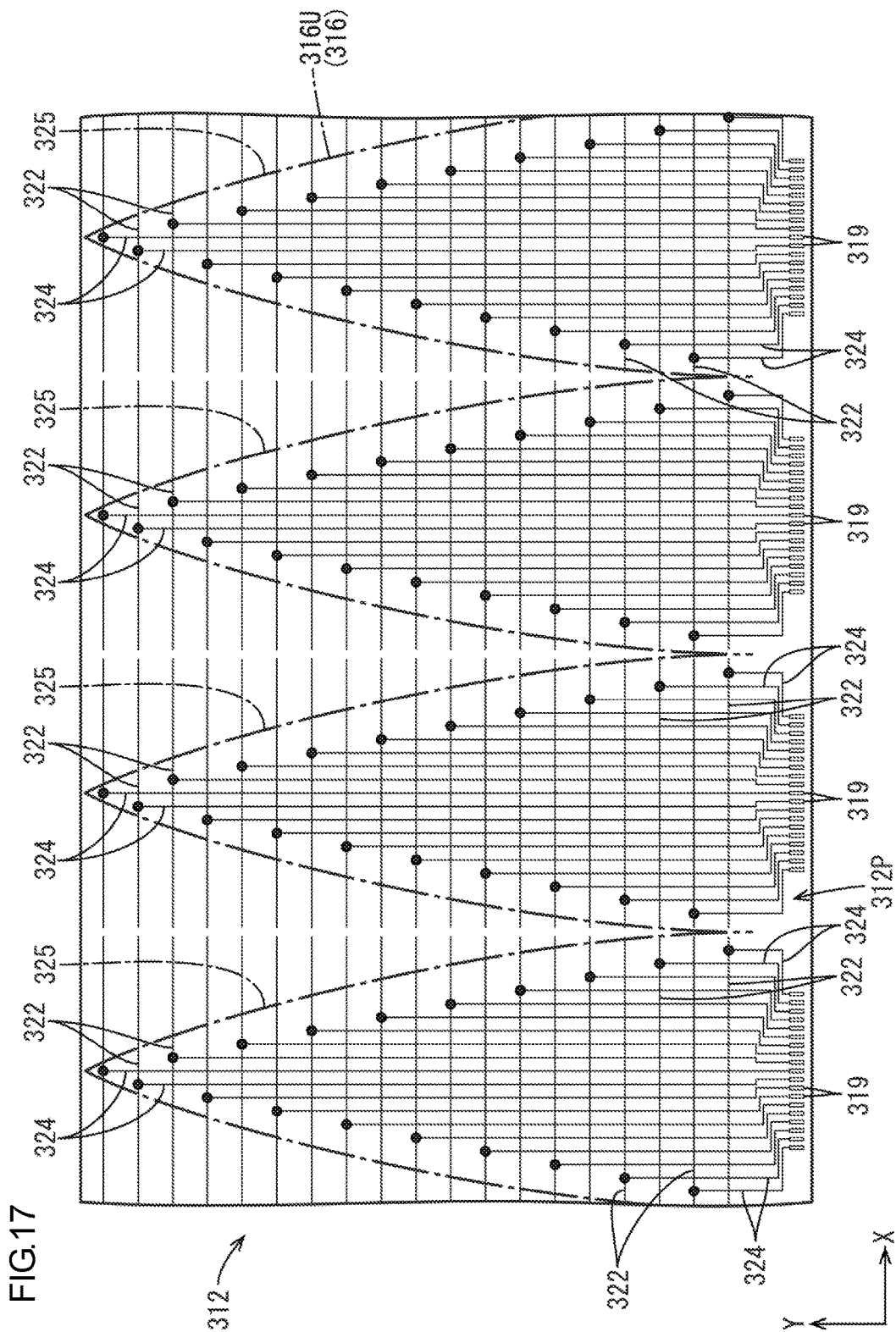
FIG. 17 is a circuit diagram schematically illustrating connection of second lines to second electrodes that form the touchscreen pattern according a fourth embodiment of the present invention.

A fourth embodiment will be described with reference to FIG. 17. The fourth embodiment includes a touchscreen 312 having a three-dimensional shape different from that of the first embodiment. Configurations, operations, and effects similar to those of the first embodiment or the second embodiment will not be described.

The touchscreen 312 according to this embodiment includes a touchscreen pattern 312P similar to that of the first embodiment. However, a three-dimensional shape is a hemispherical shape similar to the third embodiment (see FIG. 13). As illustrated in FIG. 17, the touchscreen pattern 312P includes second electrodes 322 and second lines 324. The second electrodes 322 are arranged along the X-axis direction (the second direction) and lines of the second electrodes 322 are arranged along the Y-axis direction (the first direction). The second electrodes 322 arranged farther from terminals 319 with respect to the Y-axis direction are connected to the second lines 324 arranged in the middle with respect to the X-axis direction. The second electrodes 322 arranged closer to the terminals 319 with respect to the Y-axis direction are connected to the second lines 324 arranged at ends with respect to the X-axis direction. FIG. 17 schematically illustrates the second lines 324 of what positions with respect to the X-axis direction are connected to the second electrodes 322 arranged along the Y-axis direction. First electrodes and first lines are not illustrated. The touchscreen pattern 312P groups of the electrodes 322, the lines 324 and the terminals 319 electrically connected to one another are provided for triangular portions 325, respectively. According to the configuration, outlines of the triangular portions 325 (curvature and length of the curved edges) can be freely defined.

According to this embodiment, in the pattern forming process, the touchscreen pattern 312P is formed along the X-axis direction (the second direction). In the cutting process, a use portion 316U is cut out of a base 316. The use portion 316U includes the triangular portions including wide portions on the terminal 319 side with respect to the Y-axis direction (the first direction) in a plan view. The triangular portions are arranged along the X-axis direction to correspond to portions on which the touchscreen pattern 312P is formed and linked. In the forming process, the use portion 316U is formed into the hemispherical shape. The processes are preferable for producing the touchscreen 312 having the hemispherical shape.

<Fifth Embodiment>

A fifth embodiment will be described with reference to FIG. 18. The fifth embodiment includes a touchscreen pattern 412P different from that of the second embodiment. Configurations, operations, and effects similar to those of the second embodiment will not be described.

Figure 18:
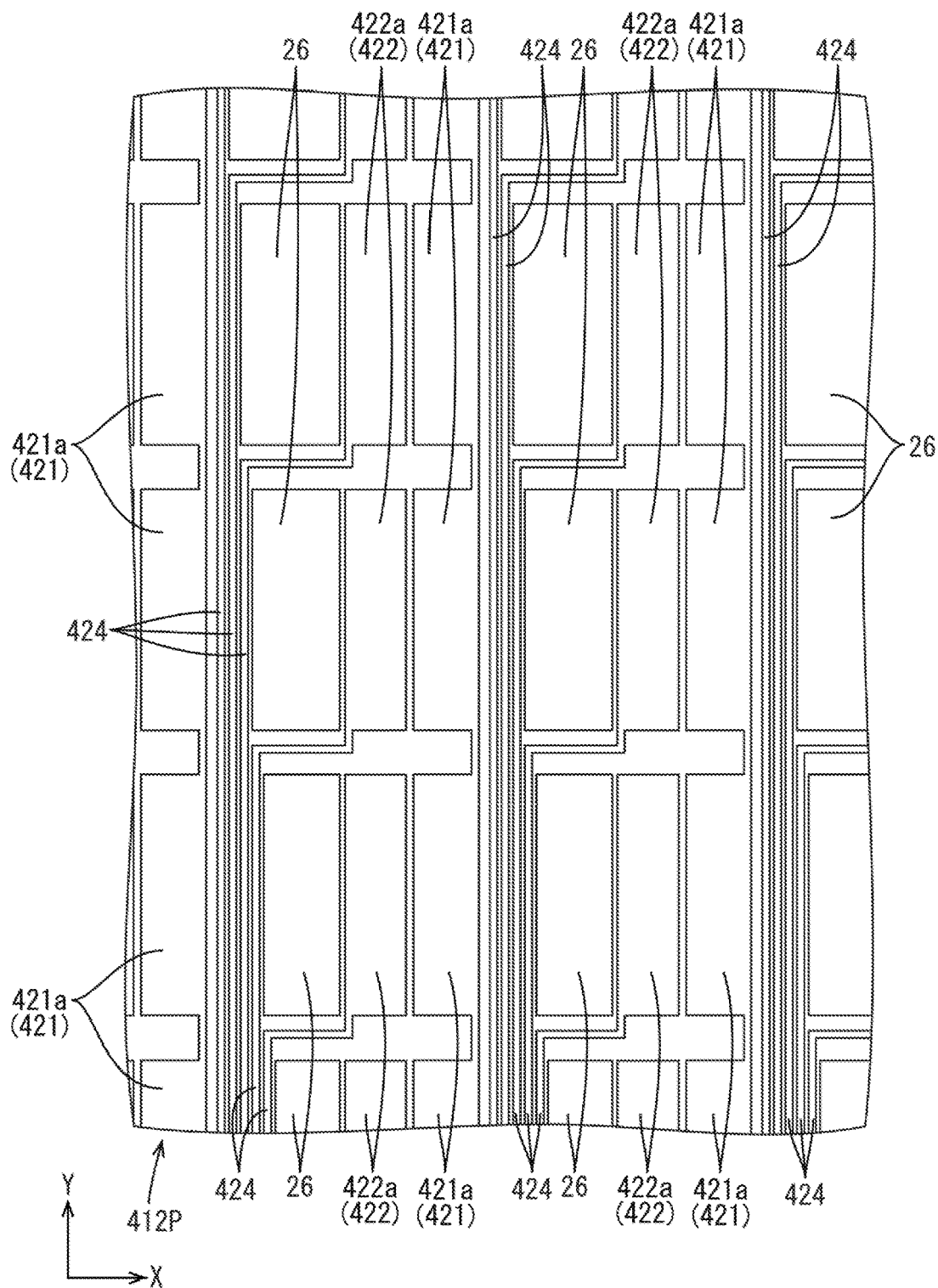
FIG. 18 is a plan view illustrating a planar configuration of a touchscreen pattern according to a fifth embodiment of the present invention.

As illustrated in FIG. 18, the touchscreen pattern 412P according to this embodiment includes first electrodes 421, second electrodes 422, and dummy electrodes 26. With the dummy electrodes 26, short dimensions of second unit electrodes 422a included in the second electrodes 422 and arranged along the Y-axis direction (the first direction) are defined equal to one another regardless of locations thereof with respect to the Y-axis direction. Furthermore, the short dimension of the second unit electrodes 422a are about equal to a short dimension of first unit electrodes 421a. The dummy electrodes 26 will be described below. In FIG. 18, terminals and first lines are not illustrated.

The dummy electrodes 26 are made of light transmissive conductive material that is the same as a material of the first electrode 421 and the second electrodes 422. Each of the dummy electrodes 26 has a vertically long rectangular in a plan view. The dummy electrodes 26 are arranged between the second unit electrodes 422a included in the second electrodes 422 and second lines 424. Lines of the dummy electrodes 26 are arranged along the Y-axis direction. The number and the intervals of the lines of the dummy electrodes 26 substantially correspond with the number and the intervals of lines of the second unit electrodes 422a. Each dummy electrode 26 has a long dimension about equal to a long dimension of the first electrode 421 and the second electrode 422. Short dimensions of the dummy electrodes 26 vary according to locations thereof with respect to the Y-axis direction. Specifically, the dummy electrode 26 located closer to the terminals with respect to the Y-axis direction (the lower side in FIG. 18) has a smaller short dimension. The dummy electrode 26 located farther from the terminals with respect to the Y-axis direction (the upper side in FIG. 18) has a larger short dimension. The short dimensions of the dummy electrodes 26 are defined such that the intervals between the dummy electrodes 26 and the second lines 424 adjacent to the dummy electrodes 26 with respect to the X-axis direction are equal to one another. With the dummy electrodes 26 arranged in spaces between the second electrodes 422 and the second lines 424, the spaces are less likely to be areas in which light transmissive conductive films made of light transmissive conductive material are not formed. Although the light transmissive conductive films have high light transmissivity, the light transmissive conductive films may absorb or reflect a small amount of light. Therefore, amount of transmitting light may be slightly different in an area in which they are formed and an area in which they are not formed. With the dummy electrodes 26, the spaces between the second electrodes 422 and the second lines 424 are not the area in which the light transmissive conductive films. Therefore, uneven brightness is less likely to occur. The dummy electrodes 26 are not connected to the electrodes 421 and 422 and electrically isolated.

<Other Embodiments>

The present invention is not limited to the embodiments, which have been described using the foregoing descriptions and the drawings. For example, embodiments described below are also included in the technical scope of the present invention.

(1) In each of the above embodiments, the electrodes and the lines are made of the light transmissive conductive material. However, the electrodes and the lines may be made of metal material such as light blocking conductive material. In this case, the electrodes and the lines made of light blocking conductive material may be formed in a mesh pattern. According to the configuration, a sufficient amount of light transmitting through the touchscreen is achieved. With the metal material used for the light blocking conductive material, a resistance of lines can be reduced. Therefore, position detecting sensitivity improves. The light blocking conductive material may include carbon nanotube, graphene, and silver nanoparticles.

(2) When the electrodes and the lines are made of the light blocking conductive material as in above embodiment (1), the electrodes and the lines may not be formed in the mesh pattern. This is suitable for a touchscreen used for a device that does not require the light transmissivity such as a remote controller in the third embodiment or the fourth embodiment.

(3) In each of the above embodiments, the material of the electrodes and the lines is the light transmissive conductive material including ITO and ZnO. However, a conductive polymer material may be used.

(4) To alter the material used for the electrodes and the lines as in embodiments (1) to (3), it is preferable to select a material having proper bending strength according to a curvature of a bending portion or a curving portion of a touchscreen formed in a three-dimensional shape because the property regarding the bending strength including ductility is different from material to material.

(5) The arrangements and the numbers of the electrodes and the lines may be altered from those in the above embodiments.

(6) In each of the first and the second embodiments, the peripheral portions of the touchscreen have the different widths. The peripheral portions may have a constant width. In this case, the width or the length of the main portion may be altered. If the length of the main portion is altered, the length of the long sides may be altered. If the width of the main portion is altered, the length of the short sides may be altered. Furthermore, the widths and the lengths of the peripheral portions and the widths and the lengths of the main portions may be altered.

(7) In each of the first and the second embodiments, the first electrodes, the first lines, and the second lines are arranged in the lower layer and the second electrodes are arranged in the upper layer. However, the second electrodes may be arranged in the lower layer and the first electrodes, the first lines, and the second lines may be arranged in the upper layer.

(8) In each of the first and the second embodiments, the touchscreen includes the main portion and the peripheral portions. However, the present invention may be applied to a touchscreen including a second main portion continuing to peripheral portions and being arranged on a rear side such that a liquid crystal display device is sandwiched between the main portion and the second main portion. In a pattern forming process, an effecting touching area of a touchscreen pattern may be formed on the second main portion. In a three-dimensional shape forming process, the touchscreen may be formed in a box shape, which is a three-dimensional shape, with a hollow. According to the configuration, detection of position input can be performed on the rear surface of the liquid crystal display device.

(9) In each of the first and the second embodiments, the touchscreen includes the main portion and four peripheral portions. However, the number of the peripheral portions may be altered. In this case, the main portion may include an edge that does not continue to the peripheral portion among four edges of peripheries of the main portion.

(10) In each of the first and the second embodiments, peripheral portions of the touchscreen are covered with the chassis. However, the peripheral portions of the touchscreen may be exposed without covered with the chassis.

(11) In each of the first and the second embodiments, the cover panel may be removed and the maim portion may be exposed without covered with the cover panel.

(12) In each of the first and the fourth embodiments, the second lines extending from the second unit electrodes continue thereto with respect to the X-axis direction are arranged in the same layer in which the first electrodes and the first lines are arranged. However, the second lines may be arranged in the same layer in which the second electrodes are arranged. In this case, portions of the second lines crossing the second links for connecting the second unit electrodes together may be bypass lines arranged in the same layer in which the first electrodes and the first lines are arranged. The main portions of the second lines may be connected to the bypass lines via contact holes.

(13) Other than embodiment (1), the second lines may be formed by a conductive layer arranged in a layer other than the layer in which the first electrodes and the second electrodes are formed.

(14) In the third embodiment, the group of terminals are provided for every two triangular portions. However, the group of terminals may be provided for every three or more triangle portions. Alternatively, the group of terminals may be provided for ever triangular portion.

(15) In the fourth embodiment, the group of terminals is provided for every triangular portion. However, the group of terminals may be provided for multiple triangular portions.

(16) In a touchscreen used for a device that does not require the light transmissivity such as a remote controller in the third embodiment or the fourth embodiment, the base may be made of light blocking insulating material.

(17) In each of the third and the fourth embodiments, the touchscreen having the hemispherical shape is used for the remote controller. However, the touchscreen having the hemispherical shape may be used for a projection display device including a hemispherical display surface.

(18) In each of the third and the fourth embodiments, the touchscreen used for the remote controller has the hemispherical shape. However, the three-dimensional shape of the touchscreen used for the remote controller may be altered as appropriate. For example, the shape may be a box shape with an opening on the rear side as in the first embodiment or the second embodiment or a hemispherical shape with an oval plan-view shape.

(19) In each of the third and the fourth embodiments, the touchscreen is used for the remote controller. However, the present invention may be applied to a touchscreen used for a device (an electronic device) other than the remote controller.

(20) A touchscreen including the touchscreen pattern of the fifth embodiment may be formed in the hemispherical shape such as the touchscreen in the third embodiment or the fourth embodiment.

(21) In each of the first and the second embodiments, the backlight unit included in the liquid crystal display device is the edge-light type. However, a liquid crystal display device including a direct backlight unit may be included in the scope of the present invention.

(22) Each of the first and the second embodiments includes the transmissive-type liquid crystal display device including the backlight unit that is an external light source. However, the present invention can be applied to a reflective-type liquid crystal display device configured to display images using ambient light. In this case, the backlight unit is not required.

(23) Each of the first and the second embodiments includes the liquid crystal display device including the display screen having the rectangular shape. However, a liquid crystal display device including a square display screen may be included in the scope of the present invention.

(24) Each of the first and the second embodiments includes the TFTs used for the switching components of the liquid crystal display device. However, a liquid crystal display device including switching components other than the TFTs (e.g., thin film diodes (TFDs)) may be included in the scope of the present invention. The present invention may be applied to a liquid crystal display device configured to display color images or a liquid crystal display device configured to display black-and-white images.

(25) Each of the first and the second embodiments includes the liquid crystal display device including a liquid crystal panel as a display panel. However, the present invention may be applied to a display device including other kinds of display panel (e.g., PDP and organic EL panel). In this case, the backlight unit is not required.

(26) In each of the first and the second embodiment sections, the method of producing the touchscreen included in the liquid crystal display device used for an electronic device such as a smartphone is described. However, the present invention may be applied to a touchscreen included in a liquid crystal display device used for an electronic device larger than the smartphone, for example, a tablet computer. In this case, dimensions of the main portion of the touchscreen may be increased according to an increase in screen size of the liquid crystal panel. Other than the smartphone and the tablet computer, the present invention may be applied to a touchscreen included in a liquid crystal display device used for a portable video game player.

EXPLANATION OF SYMBOLS

12, 112, 212, 312: touchscreen (position input device), 12a, 112a: main portion, 12b, 112b: peripheral portion, 12P, 112P, 212P, 312P, 412P: touchscreen pattern (position input pattern), 16, 116, 216, 316: base, 16U, 116U, 216U, 316U: use portion, 17: electrode portion, 18: line portion, 19, 119, 219, 319: terminal, 20: insulating layer, 21, 121, 221, 421: first electrode, 21a, 121a, 221a, 421a: first unit electrode, 22, 122, 222, 322, 422: second electrode, 22a, 122a, 222a, 422a: second unit electrode, 23, 123, 223: first line, 24, 124, 224, 324, 424: second line, 25, 325: triangular portion.

The invention claimed is:

1. A method of producing a position input device, the method comprising:
   a pattern forming process for forming at least one position input pattern including at least an electrode portion and a line portion on a plate surface of a base having a sheet shape and flexibility;
   a cutting process for cutting a use portion out of the base on which the at least one position input pattern is formed; and
   a three-dimensional shape forming process for forming the use portion cut out of the base into a three-dimensional shape, wherein
   the pattern forming process comprises forming the at least one position input pattern on the plate surface of the base, the at least one position input pattern includes:
      first electrodes included in the electrode portion, the first electrodes including first unit electrodes arranged along a first direction along the plate surface of the base and linked one another, lines of the first electrodes being arranged along a second direction along the plate surface of the base and perpendicular to the first direction;
      second electrodes included in the electrode portion, the second electrodes including second unit electrodes arranged along the second direction and adjacent to the first unit electrodes in a plan view and linked one another, lines of the second electrodes being arranged along the first direction;
      an insulating layer arranged between the first electrodes and the second electrodes crossing each other, the insulating layer being for insulating the first electrodes from the second electrodes;
      terminals arranged at one end of the base with respect to the first direction;
      first lines included in the line portion and extending from the first unit electrodes arranged at an end closer to the terminals, ends of the first lines being connected to the terminals; and
      second lines included in the line portion and extending from the second electrodes, ends of the second lines being connected to the terminals, the second lines being routed in spaces between the first unit electrodes and the second unit electrodes adjacent to each other in a plan view.

2. The method of producing the position input device according to claim 1, wherein the pattern forming process includes arranging the second lines connected to the second electrodes that are farther from the terminals closer to a middle with respect the first direction and arranging the second lines connected to the second electrodes that are closer to the terminals closer to ends with respect to the first direction.

3. The method of producing the position input device according to claim 2, wherein
   the pattern forming process includes forming position input patterns included in the at least one position input pattern along the second direction,
   the cutting process includes cutting the use portion out of the base such that triangular portions having a larger width on a terminal side with respect to the first direction in a plan view are arranged along the second direction to correspond to portions in which the position input patterns are formed and such that the triangular portions are continue from one another, and the forming process includes forming the use portion into a hemispherical shape.

4. The method of producing the position input device according to claim 1, wherein the cutting process includes cutting the use portion out of the base such that a main portion including a central portion and peripheral portions including edge portions continue from the main portion, and the forming process includes forming the use portion into a three-dimensional shape such that plate surfaces of the peripheral portions are perpendicular to a plate surface of the main portion.

5. A method of producing a position input device, the method comprising:

a pattern forming process for forming at least one position input pattern including at least an electrode portion and a line portion on a plate surface of a base having a sheet shape and flexibility;

a cutting process for cutting a use portion out of the base on which the at least one position input pattern is formed; and a three-dimensional shape forming process for forming the use portion cut out of the base into a three-dimensional shape, wherein the pattern forming process comprises forming the at least one position input pattern on the plate surface of the base, the at least one position input pattern includes:

first electrodes included in the electrode portion, the first electrodes including first unit electrodes arranged along a first direction along the plate surface of the base and linked one another, lines of the first electrodes being arranged along a second direction along the plate surface of the base and perpendicular to the first direction;

second electrodes included in the electrode portion, the second electrodes including second unit electrodes arranged along the first direction and adjacent to the first unit electrodes with respect to the second direction, lines of the second electrodes being arranged along the second direction;

terminals arranged at one end of the base with respect to the first direction;

first lines included in the line portion and extending from the first unit electrodes arranged at an end closer to the terminals, ends of the first lines being connected to the terminals; and second lines included in the line portion and extending from the respective second unit electrodes, ends of the second lines being connected to the terminals, the second lines being routed between the first unit electrodes and the second unit electrodes adjacent to each other with respect to the second direction.

6. The method of producing the position input device according to claim 5, wherein the pattern forming process includes forming the second electrodes as driving electrodes for generating electric fields and the first electrodes as detecting electrodes for detecting the electric fields generated by the driving electrodes.

7. The method of producing the position input device according to claim 5, wherein the cutting process includes cutting the use portion out of the base such that triangular portions having a larger width on a terminal side with respect to the first direction in a plan view are arranged along the second direction and continue from one another, and the forming process includes forming the use portion into a hemispherical shape.

8. The method of producing the position input device according to claim 5, wherein the cutting process includes cutting the use portion out of the base such that a main portion including a central portion and peripheral portions including edge portions continue from the main portion, and the forming process includes forming the use portion into a three-dimensional shape such that plate surfaces of the peripheral portions are perpendicular to a plate surface of the main portion.

* * * * *